US012771765B2

(12) United States Patent
Son et al.

(10) Patent No.: US 12,771,765 B2
(45) Date of Patent: Oct. 20, 2026

(54) METHOD FOR CONTROLLING DISPLAY AND ELECTRONIC DEVICE THEREFOR

(71) Applicant: Samsung Electronics Co., Ltd., Suwon-si (KR)

(72) Inventors: Dongil Son, Suwon-si (KR); Chihyun Cho, Suwon-si (KR); Hyuncheol Jin, Suwon-si (KR); Hyoseok Na, Suwon-si (KR); Gun Lim, Suwon-si (KR); Jaebong Chun, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 18/571,040

(22) PCT Filed: Oct. 19, 2021

(86) PCT No.: PCT/KR2021/014606
§ 371 (c)(1),
(2) Date: Dec. 15, 2023

(87) PCT Pub. No.: WO2022/092671
PCT Pub. Date: May 5, 2022

(65) Prior Publication Data

US 2026/0156208 A1 Jun. 4, 2026

(30) Foreign Application Priority Data

Oct. 29, 2020 (KR) ........................ 10-2020-0142345

(51) Int. Cl.
*H04M 1/02* (2006.01)
*G09G 3/00* (2006.01)
(Continued)

(52) U.S. Cl.
CPC .......... *H04M 1/0241* (2013.01); *G09G 3/035* (2020.08); *G09G 3/2096* (2013.01);
(Continued)

(58) Field of Classification Search
CPC .... G06F 1/1616; G06F 1/1643; G06F 1/1647; G06F 1/1652; G06F 1/3215;
(Continued)

(56) References Cited

U.S. PATENT DOCUMENTS 10,038,013 B2 7/2018 Kwon et al.
10,506,170 B2 12/2019 Lombardi et al.
(Continued)

FOREIGN PATENT DOCUMENTS

CN 109407932 A 3/2019
CN 110045936 A 7/2019
(Continued)

OTHER PUBLICATIONS

International Search Report dated Feb. 10, 2022, issued in International Patent Application No. PCT/KR2021/014606.
(Continued)

*Primary Examiner* — Nelson M Rosario
(74) *Attorney, Agent, or Firm* — Jefferson IP Law, LLP

(57) ABSTRACT

An electronic device is provided. The electronic device includes a first housing, a second housing movable and superimposed with respect to the first housing, a display of which a first area is exposed to the outside, wherein the display has a second area extended from the first area, upon switching from a first state to a second state, the second area is drawn out from inside the first housing and is exposed to the outside, and upon switching from the second state to the first state, the second area is inserted into the first housing, and a processor coupled to the display and configured to control the display such that the first area operates at a first
(Continued)

scan rate in the first state, upon switching from the first state to the second state, the display operates at a second scan rate higher than the first scan rate.

20 Claims, 18 Drawing Sheets

(51) Int. Cl.
*G09G 3/20* (2006.01)
*G09G 3/3266* (2016.01)

(52) U.S. Cl.
CPC ........ *G09G 3/3266* (2013.01); *H04M 1/0235* (2013.01); *H04M 1/0268* (2013.01); *G09G 2320/0252* (2013.01); *G09G 2340/0435* (2013.01)

(58) Field of Classification Search
CPC .... G06F 1/3231; G06F 1/3262; G06F 1/3265; G06F 1/3296; G06F 3/01; G06F 3/0484; G06F 3/1423; G06F 3/1431; G06F 3/1446; G06F 2203/04102; G06F 2203/04803; G06F 3/0414; G06F 1/16; G06F 1/1684; G06F 3/14; G09G 2354/00; G09G 2380/02; G09G 5/22; G09G 5/227; G09G 2340/0435; Y02D 10/00; G09F 9/30; G09F 9/301
See application file for complete search history.

(56) References Cited

U.S. PATENT DOCUMENTS

| | | | |
|---|---|---|---|
| 11,093,203 B2 | 8/2021 | Park et al. | |
| 2010/0261506 A1 | 10/2010 | Rajamani et al. | |
| 2012/0162238 A1 | 6/2012 | Fleck et al. | |
| 2014/0104298 A1 | 4/2014 | Park et al. | |
| 2014/0184518 A1 | 7/2014 | Valavi | |
| 2014/0198093 A1 | 7/2014 | Nambi et al. | |
| 2015/0243203 A1 | 8/2015 | Kim et al. | |
| 2015/0262331 A1 | 9/2015 | Bang et al. | |
| 2016/0066409 A1 | 3/2016 | Kwon et al. | |
| 2016/0239091 A1 | 8/2016 | Forutanpour et al. | |
| 2016/0274690 A1* | 9/2016 | Tripathi ................ | G06T 19/006 |
| 2018/0032106 A1 | 2/2018 | Yu et al. | |
| 2019/0278336 A1 | 9/2019 | Choi et al. | |
| 2020/0301641 A1 | 9/2020 | Park et al. | |
| 2021/0035524 A1* | 2/2021 | Chun ........................ | G06T 3/40 |
| 2022/0115473 A1 | 4/2022 | Han et al. | |

FOREIGN PATENT DOCUMENTS

| | | |
|---|---|---|
| JP | 2013-20020 A | 1/2013 |
| JP | 6651534 B2 | 2/2020 |
| KR | 10-2012-0013988 A | 2/2012 |
| KR | 10-2014-0015278 A | 2/2014 |
| KR | 10-2014-0048701 A | 4/2014 |
| KR | 10-2015-0055653 A | 5/2015 |
| KR | 10-2015-0094766 A | 8/2015 |
| KR | 10-2015-0100515 A | 9/2015 |
| KR | 10-2015-0106211 A | 9/2015 |
| KR | 10-2016-0145199 A | 12/2016 |
| KR | 10-2017-0025302 A | 3/2017 |
| KR | 10-2017-0046683 A | 5/2017 |
| KR | 10-2018-0014386 A | 2/2018 |
| KR | 10-2019-0105858 A | 9/2019 |
| KR | 10-2020-0112378 A | 10/2020 |

OTHER PUBLICATIONS

Korean Office Action dated Jul. 31, 2024, issued in Korean Patent Application No. 10-2020-0142345.
Korean Notice of Patent Grant dated Apr. 27, 2025, issued in a Korean Patent Application No. 10-2020-0142345.

* cited by examiner

METHOD FOR CONTROLLING DISPLAY AND ELECTRONIC DEVICE THEREFOR

CROSS-REFERENCE TO RELATED APPLICATION(S)

This application is a U.S. National Stage application under 35 U.S.C. § 371 of an International application number PCT/KR 2021/014606, filed on Oct. 19, 2021, which is based on and claimed priority of a Korean patent application number 10-2020-0142345, filed on Oct. 29, 2020, in the Korean Intellectual Property Office, the disclosure of which is incorporated by reference herein in its entirety.

BACKGROUND

1. Field

The disclosure relates to a technique for controlling a display of an electronic device having a flexible display.

2. Description of Related Art

Electronic devices have become equipped with complex functions, such as taking photos or moving images, playing music or moving image files, playing games, receiving broadcasts, and supporting wireless Internet, and are being implemented in the form of comprehensive multimedia players. Accordingly, the electronic devices are under development into new forms in terms of hardware or software to satisfy users'needs while enhancing portability and convenience. As an example of such a development, the electronic devices may be implemented as flexible types.

Meanwhile, a scan rate means the number of times a display displays a frame on a screen for one second, and a technique which enables various scan rates is implemented to improve quality of the display. The scan rate of the display may organically vary depending on user's settings or content. In general, if the scan rate is high, screen quality may be improved when a moving image is reproduced. On the contrary, since a low scan rate is provided in a static screen in which there is no change on the screen, it may be advantageous in terms of current consumption.

The above information is presented as background information only to assist with an understanding of the disclosure. No determination has been made, and no assertion is made, as to whether any of the above might be applicable as prior art with regard to the disclosure.

SUMMARY

A flexible-type electronic device changes in a mechanical state by a user manipulation. In addition, the flexible-type electronic device controls an operation of the electronic device, based on a state change. For example, the flexible-type electronic device switches from a state of being rolled in inside the electronic device to a state of being rolled out. Upon changing the state in the flexible-type electronic device, if content is displayed at a scan rate lower than a maximum scran rate of the electronic device, the content is displayed unnaturally, impairing user experience.

Aspects of the disclosure are to address at least the above-mentioned problems and/or disadvantages and to provide at least the advantages described below. Accordingly, an aspect of the disclosure is to provide a method for controlling display and electronic device therefor.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing movable and at least partially superimposed with respect to the first housing, a display of which at least a first area is exposed to outside of the electronic device through a front face of the electronic device, wherein the display has a second area extended from the first area of the display such that, when the electronic device switches from a first state to a second state, the second area is drawn out from inside the first housing and is exposed to the outside of the electronic device together with the first area, and when the electronic device switches from the second state to the first state, the second area is inserted into the first housing, and at least one processor operatively coupled to the display. The at least one processor is configured to control the display such that the first area of the display operates at a first scan rate in the first state, control the display such that, while the electronic device switches from the first state to the second state, the display operates at a second scan rate higher than the first scan rate at least with respect to the first area, and control the display such that, in response to completion of the switching to the second state, the display operates at the first scan rate with respect to the first area and the second area.

In accordance with another aspect of the disclosure, a method of operating an electronic device is provided. The method includes controlling a display such that a first area of the display operates at a first scan rate in a first state of the electronic device, controlling the display such that, while the electronic device switches from the first state to a second state, the display operates at a second scan rate higher than a first rate at least with respect to the first area, and controlling the display such that, in response to completion of the switching to the second state, the display operates at the first scan rate with respect to the first area and a second area.

In accordance with another aspect of the disclosure, an electronic device is provided. The electronic device includes a first housing, a second housing movable and at least partially superimposed with respect to the first housing, a flexible display of which an exposure area exposed through a front face of the electronic device varies depending on relative movement of the first and second housings, and at least one processor operatively coupled to the display. The at least one processor is configured display first content on the flexible display at a first scan rate in a first state, display the first content on a first area in the exposure area of the display at a second scan rate while the electronic device is in the first state, and display second content different from the first content on a second area in the exposure area at a third scan rate. The second scan rate and the third scan rate are determined based on attributes of the first content and the second content, respectively. The display displays the first content and the second content at the first scan rate with respect to the first area and the second area, in response to completion of switching to the second state.

According to various embodiments of the disclosure, since a scan rate changes when a state of an electronic device changes, user experience and efficiency of the electronic device, such as heating, is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
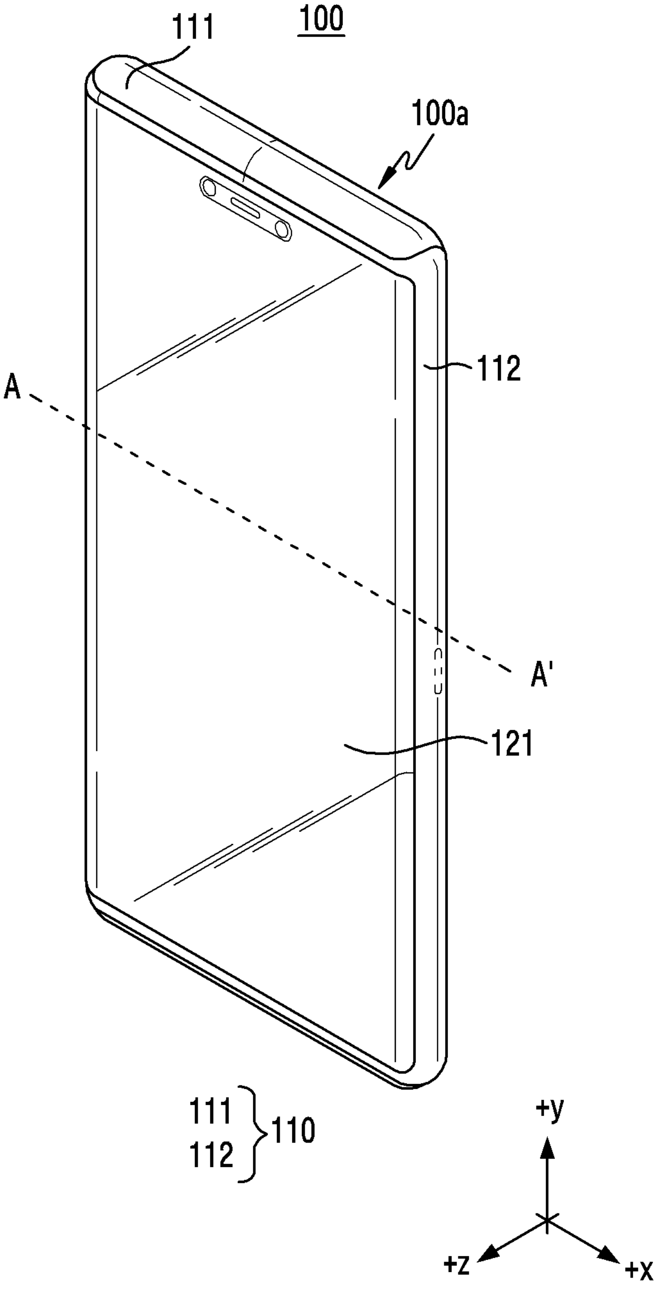
FIG. 1A is a front perspective view illustrating an electronic device in a first state (e.g., a reduced state) according to an embodiment of the disclosure.

FIG. 1A is a front perspective view illustrating an electronic device 100 in a first state (e.g., a reduced state) according to an embodiment of the disclosure.

Figure 1B:
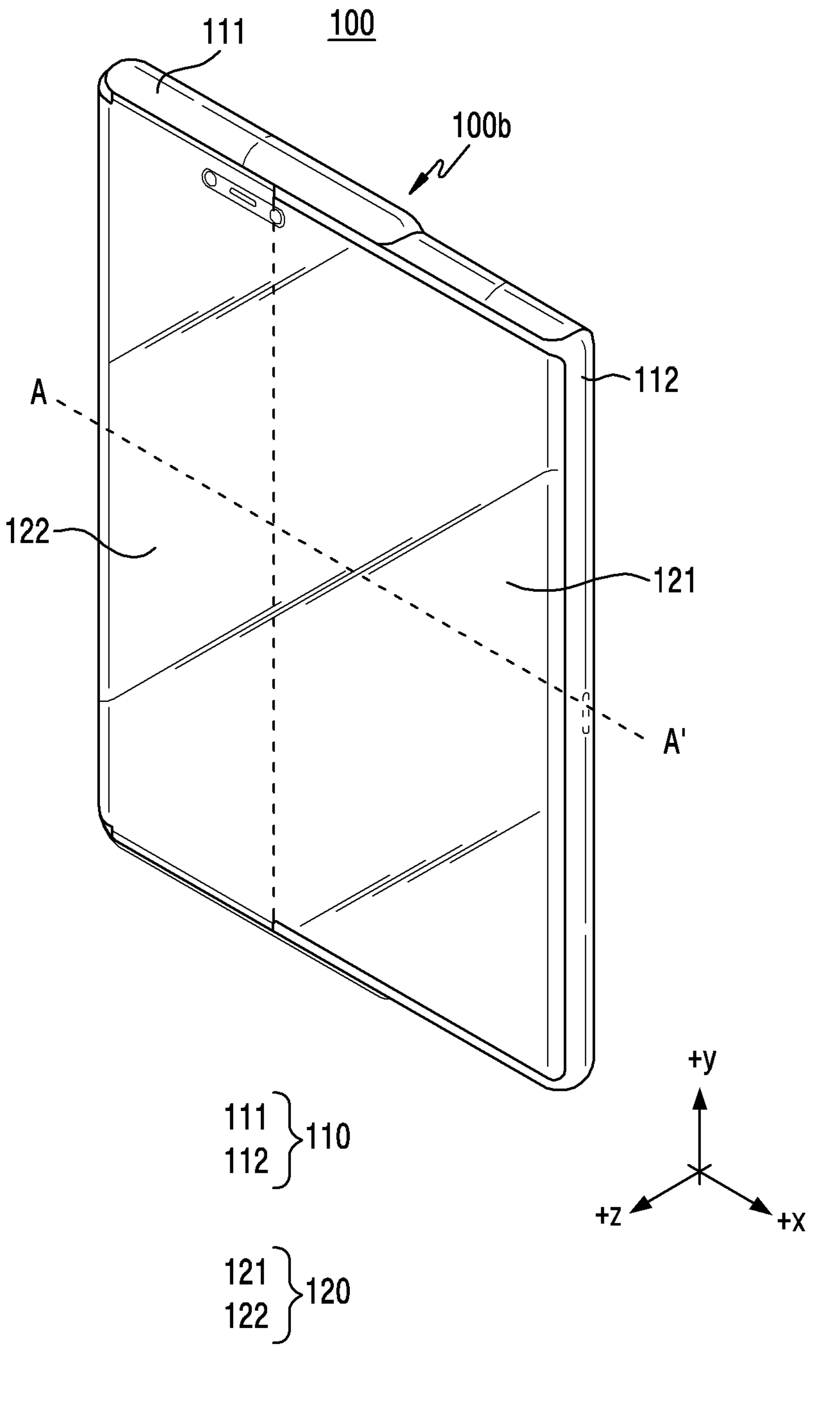
FIG. 1B is a front perspective view illustrating an electronic device in a second state (e.g., an extended state) according to an embodiment of the disclosure.

FIG. 1B is a front perspective view illustrating the electronic device 100 in a second state (e.g., an extended state) according to an embodiment of the disclosure.

Referring to FIGS. 1A and 1B, according to various embodiments of the disclosure, a face facing substantially the same direction as a direction facing at least part (e.g., a first portion 121) of a flexible display 120 located outside the electronic device 100 may be defined as a front face of the electronic device 100, and a face opposite to the front face may be defined as a rear face of the electronic device 100. A face surrounding a space between the front face and the rear face may be defined as a side face of the electronic device 100.

The flexible display 120 may be disposed to at least part of the electronic device 100 according to an embodiment. According to an embodiment of the disclosure, the flexible display 120 may be disposed to include at least part of a flat shape and at least part of a curved shape. According to an embodiment of the disclosure, the flexible display 120 and a slidable housing 110 surrounding at least part of an edge of the flexible display 120 may be disposed to the front face of the electronic device 100.

According to an embodiment of the disclosure, the slidable housing 110 may constitute part of an area of the front face of the electronic device 100 (e.g., a face of the electronic device 100 facing a +z direction of FIGS. 1A and 1B), the rear face thereof (e.g., a face of the electronic device 100 facing a −z direction of FIGS. 1A and 1B), and the side face thereof (e.g., a face connecting between the front face and rear face of the electronic device 100). According to another embodiment of the disclosure, the slidable housing 110 may constitute part of an area of the side face of the electronic device 100 and the rear face thereof.

According to an embodiment of the disclosure, the slidable housing 110 may include a first housing 111 and a second housing 112 coupled movably in a specific range with respect to the first housing 111.

According to an embodiment of the disclosure, the flexible display 120 may include the first portion 121 capable of being coupled to the second housing 112 and a second portion 122 capable of being inserted into the electronic device 100 by being extended from the first portion 121.

According to an embodiment of the disclosure, the electronic device 100 may include a first state 100*a* and a second state 100*b*. For example, the first state 100*a* and second state 100*b* of the electronic device 100 may be determined depending on a relative position of the second housing 112 with respect to the sliceable housing 110, and the electronic device 100 may be configured to be changeable between the first state 100*a* and the second state 100*b* by a user's manipulation or mechanical operation.

According to an embodiment of the disclosure, the first state 100*a* of the electronic device 100 may mean a state before the slidable housing 110 is extended. The second state 100*b* of the electronic device 100 may mean a state in which the slidable housing 110 is extended.

According to an embodiment of the disclosure, when the electronic device 100 switches from the first state 100*a* to the second state 100*b* in accordance with the movement of the second housing 112, the second portion 122 of the flexible display 120 may be drawn out (or exposed) to the outside from the inside of the electronic device 100. According to an embodiment of the disclosure, the drawing out (or exposing) of the flexible display 120 may mean that the flexible display 120 is viewable from the outside of the electronic device 100. In another embodiment of the disclosure, when the electronic device 100 switches from the second state 100*b* to the first state 100*a* in accordance with the movement of the second housing 112, the second portion 122 of the flexible display 120 may be inserted into the electronic device 100. According to an embodiment of the disclosure, the inserting of the flexible display 120 may mean that the electronic device 100 is not viewable from the outside of the electronic device 100.

Figure 2:
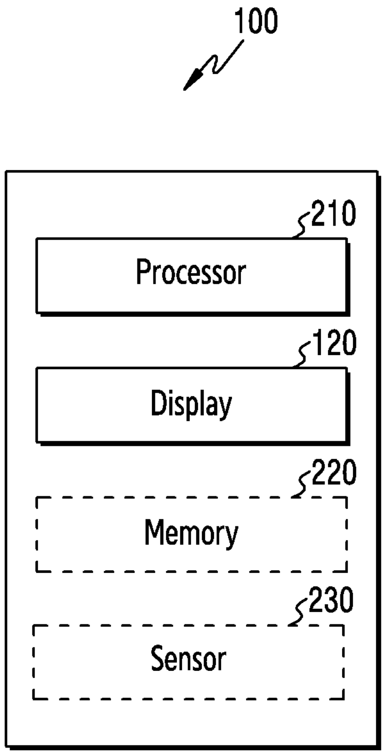
FIG. 2 is a block diagram illustrating hardware of an electronic device according to an embodiment of the disclosure.

FIG. 2 is a block diagram illustrating hardware of an electronic device according to an embodiment of the disclosure.

Referring to FIG. 2, an electronic device according to an embodiment (e.g., the electronic device 100 of FIGS. 1A and 1B) may include a processor 210, a display 120, memory 220, and a sensor 230. In various embodiments of the disclosure, the electronic device 100 may include an additional component other than the components of FIG. 2, or at least one of the components of FIG. 2 may be omitted.

According to an embodiment of the disclosure, the processor 210 may use instructions stored in the memory 220 to control at least one of other components of the electronic device 100 and/or execute an arithmetic operation or data processing for communication. According to an embodiment of the disclosure, the processor 210 may include at least one of a central processing unit (CPU), a graphic processing unit (GPU), a micro controller unit (MCU), a sensor hub, a supplementary processor, a communication processor, an application processor, an application specific integrated circuit (ASIC), and a field programmable gate arrays (FPGA), and may have a plurality of cores.

According to an embodiment of the disclosure, the processor 210 may use the sensor 230 to identify an extension level of the electronic device 100. According to an embodiment of the disclosure, the processor 210 may control a display to dynamically change a resolution with the extension of the electronic device 100. Details related to the operation of the processor 210 will be described below with reference to FIG. 3 and FIG. 9.

According to an embodiment of the disclosure, the display 120 may display a variety of content (e.g., a text, an image, a video, an icon, and/or a symbol, or the like). According to an embodiment of the disclosure, the display 120 may include a liquid crystal display (LCD), a light emitting diode (LED) display, or an organic light emitting diode (OLED) display. According to an embodiment of the disclosure, the display 120 may operate at a resolution changed depending on an instruction of the processor 210. According to an embodiment of the disclosure, the display 120 may include touch circuitry configured to detect a touch, or sensor circuitry (e.g., a pressure sensor) configured to measure intensity of force incurred by the touch. According to an embodiment of the disclosure, information collected through an interface of the display 120 may be processed in the sensor 230.

According to an embodiment of the disclosure, the memory 220 may store a variety of data obtained or used by at least one component (e.g., the processor) of the electronic device 100. According to an embodiment of the disclosure, the memory 220 may store instructions for providing an animation effect. According to an embodiment of the disclosure, the processor 210 may provide a specified animation effect with the extension of the display 120. For example, the specified animation effect may include at least one of a position movement, color change, shape change, and size change of an object included in a screen.

According to an embodiment of the disclosure, the sensor 230 may include a distance sensor for measuring a movement level of the housing 110. For example, the distance sensor may measure a distance of the second housing 112 with respect to the first housing 111. For example, the sensor 230 may include at least one of a time of flight (TOF) sensor, an ultrasonic sensor, and a radio wave sensor. According to another embodiment of the disclosure, the sensor 230 may include a sensor which detects a state of the display 120. For example, the display 120 may be configured to produce distinct electrical signals in the first state 100*a* and the second state 100*b*. According to an embodiment of the disclosure, the sensor 230 may include a hall sensor or a magnet sensor.

Figure 3:
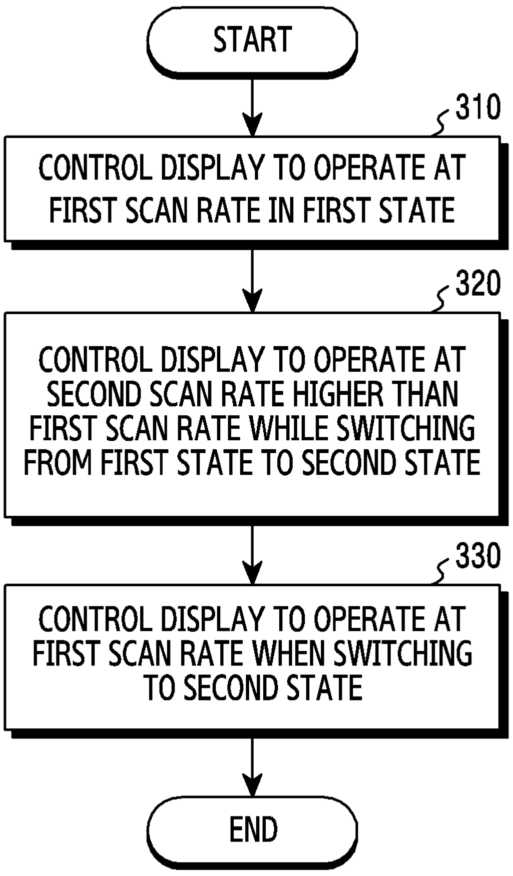
FIG. 3 is a flowchart for explaining an electronic device which controls a scan rate of a display according to an embodiment of the disclosure.

FIG. 3 is a flowchart for explaining an electronic device which controls a scan rate of a display (e.g., the display 120 of FIG. 2) according to an embodiment of the disclosure.

Referring to FIG. 3, in operation 310, a processor according to an embodiment (e.g., the processor 210 of FIG. 2) may control the display 120 to operate at a first scan rate when the electronic device 100 is in a first state (e.g., the first state 100*a* of FIG. 1A).

According to an embodiment of the disclosure, the processor 210 may dynamically change a scan rate, based on an execution screen which is output to the display 120. According to an embodiment of the disclosure, the processor 210 may control the display 120 to operate at a high scan rate (e.g., 120 Hz) when a dynamic execution screen is output to the display 120. For example, the dynamic execution screen may mean an execution screen of which a screen moves within a specified threshold time, such as game content or a moving image. As another example, the processor 210 may control the display 120 to operate at a low scan rate (e.g., 1 Hz) when a static execution screen is output to the display 120 or when in an Always On Demand (AOD) mode. For example, the static execution screen may mean an execution screen of which a screen does not change within a specified threshold time, such as a home screen or an image, or of which an area to be changed is less than a specified ratio.

According to an embodiment of the disclosure, in operation 320, the processor 210 may control the display 120 to operate at a second scan rate higher than the first scan rate while the electronic device 100 switches from the first state

100*a* to a second state 100*b*. For example, the first scan rate may correspond to 60 Hz, and the second scan rate may correspond to 120 Hz. According to another embodiment of the disclosure, when the static execution screen is output to the display 120, the processor 210 may control the display 120 to operate at the first scan rate without having to change the scan rate while the electronic device 100 switches from the first state 100*a* to the second state 100*b*.

According to an embodiment of the disclosure, the processor 210 may detect the extension of the electronic device 100 through the sensor 230. According to an embodiment of the disclosure, the sensor 230 may include at least one of a touch sensor, a ToF sensor, a proximity sensor, an inertia sensor, and a hall sensor, but is not limited thereto. For example, the processor 210 may use the ToF sensor to detect a distance of the second housing 112 with respect to the first housing 111, thereby detecting movement of the second housing 112. As another example, the processor 210 may use the hall sensor to detect a state change of the electronic device 100, such as an exposure state (a size of an exposed area) of the display 120.

According to an embodiment of the disclosure, upon detecting the extension of the electronic device 100 through the sensor 230, the processor 210 may control the display 120 to operate at the high scan rate while the electronic device 100 is extended.

According to an embodiment of the disclosure, in operation 330, the processor 210 may control the display 120 to operate at the first scan rate when the electronic device 100 switches to the second state 100*b*. According to an embodiment of the disclosure, the processor 210 may determine an extension state of the electronic device 100 through the sensor 230. According to an embodiment of the disclosure, upon determining that the extension of the electronic device 100 is complete, the processor 210 may control the display 120 to return to the first scan rate.

In the disclosure, the scan rate may be referred to as a screen refresh rate or a screen refresh frequency or the like.

Figure 4:
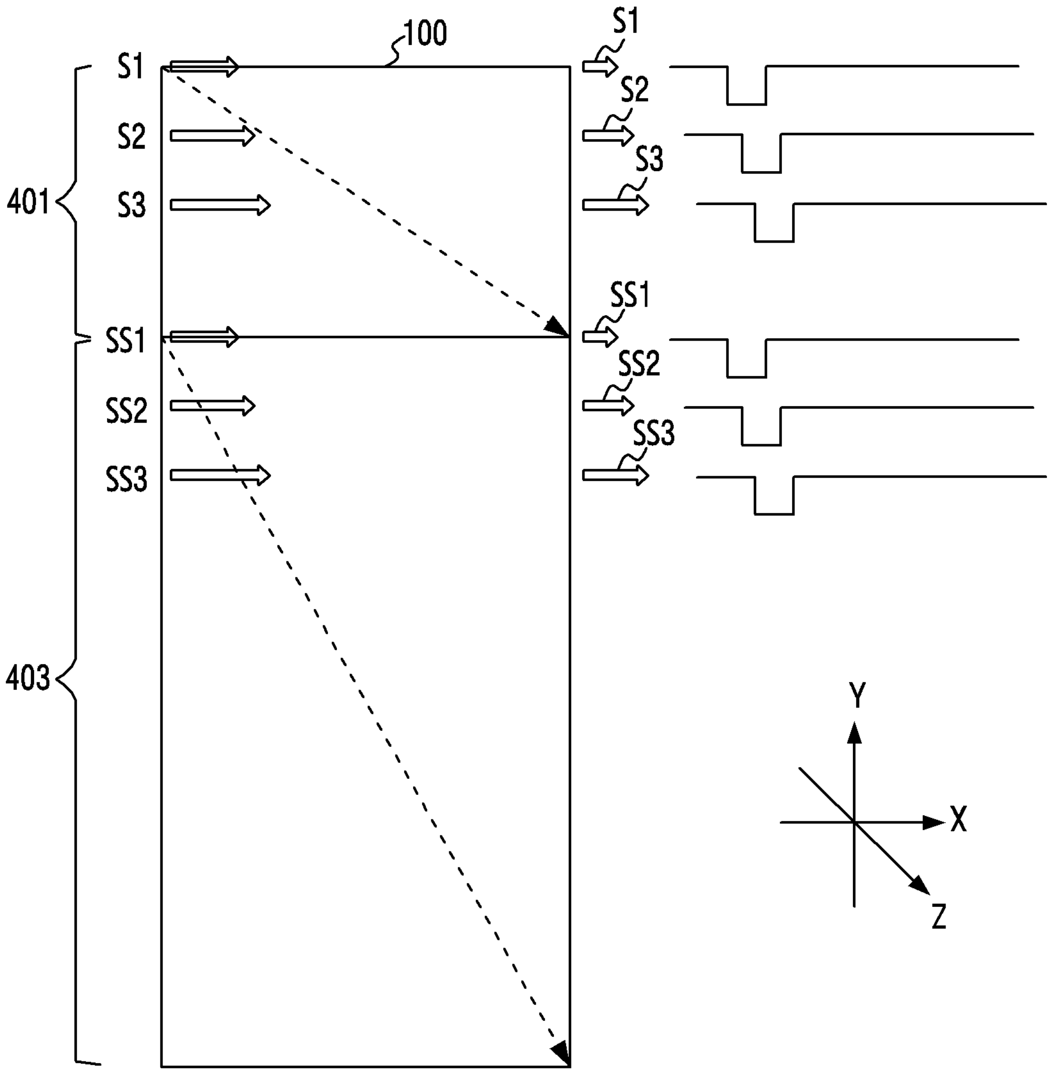
FIG. 4 illustrates controlling a display of an electronic device for each area according to an embodiment of the disclosure.

FIG. 4 illustrates an example of controlling a display of an electronic device for each area according to an embodiment of the disclosure.

Referring to FIG. 4, the electronic device 100 according to various embodiments may determine a screen refresh rate of the display 120. The display 120 of the electronic device 100 may be classified into a first area 401 and a second area 403. For example, positions or sizes of the first and second areas 401 and 403 may be determined by considering user's usability.

In an embodiment of the disclosure, the display 120 may include a display panel and a Display Driver Integrated circuit (DDI). The display panel may include a plurality of pixels arranged in a matrix form, and scan signal lines and data signal lines corresponding to the plurality of pixels may be coupled to the DDI.

In a comparative embodiment of the disclosure, the DDI may control the entire area of the display panel by transferring scan signals or data signals sequentially starting from S1 to S2, S3 . . . SS1, SS2, SS3 to the display panel. The scan signal may be sequentially transferred from top to bottom in a z-axis (e.g., a dotted arrow) direction without distinction between the first area 401 and the second area 403.

In an embodiment of the disclosure, the DDI may provide control by classifying the first area 401 and the second area 403 as separate display areas by transferring a first scan signal (or a first data signal) corresponding to the first area 401 to the display panel and transferring a second scan signal (or a second data signal) corresponding to the second area 403 to the display panel. The DDI may control a screen refresh rate of the display 120 by transferring the first scan signal (e.g., S1, S2, S3, . . . ) according to a control command of a processor (e.g., the processor 210 of FIG. 2) to the display panel corresponding to the first area 401 and transferring the second scan signal (e.g., SS1, SS2, SS3, . . . ) corresponding to the second area 403 to the display panel. The electronic device 100 may set a screen refresh rate of the first area 401 and a screen refresh rate of the second area 403 to be the same or different from each other.

According to an embodiment of the disclosure, an image (or a video) may be created with continuous movement of a still screen (or a frame). According to an embodiment of the disclosure, the screen refresh rate means the number of times the display 120 displays a frame on a screen for one second, and may be a numerical value representing how many scenes can be displayed for one second. According to an embodiment of the disclosure, the screen refresh rate uses Hertz (Hz) which means the number of repetitions per second, as a unit. For example, a display with a refresh rate of 60 Hz may mean that the screen is divided into 60 steps for one second. As a similar concept, a Frame Per Second (FPS) may be used primarily for an image source (e.g., software). Hertz is a concept of frequency at which cycles are repeated, and thus may be used for hardware of the display. The Hertz may mean a screen refresh rate or a driving frequency of the display.

According to various embodiments of the disclosure, the electronic device 100 may determine the screen refresh rate of the first and second areas 401 and 403, based on a user interface to be displayed on the display 120. For example, the user interface may include a video in association with the first area 401, and may include a still image or a text in association with the second area 403. According to an embodiment of the disclosure, based on the user interface, the electronic device 100 may set a first screen refresh rate (e.g., 60 Hz) in association with the first area 401, and may set a second screen refresh rate (e.g., 30 Hz) in association with the second area 403. For example, being based on the user interface may mean that it is based on a frame rate of an image to be displayed, a type of data to be displayed (e.g., a moving image, an image, or a text), a type of an application (e.g., a media player, a game, a camera, a browser, or a message), and/or a name of the application.

According to an embodiment of the disclosure, the DDI may transfer the first scan signal (e.g., S1, S2, S3, . . . ), in which the first screen refresh rate is set, to the display panel corresponding to the first area 401, and may transfer the second scan signal (e.g., SS1, SS2, SS3, . . . ), in which the second screen refresh rate is set, to the display panel corresponding to the second area 403. According to an embodiment of the disclosure, the display panel may display a video on the first area 401 at the first screen refresh rate, and may display a still image or a text on the second area 403 at the second screen refresh rate.

According to an embodiment of the disclosure, the first screen refresh rate may be set to be the same as, lower than, or higher than the second screen refresh rate. Although it is illustrated in the figure that the display 120 is divided into two areas (e.g., the first area 401, the second area 403), the number of divided areas may exceed two. In addition, although it is illustrated in the figure that the first area 401 and the second area 403 have different sizes, the first area 401 and the second area 403 may have the same size.

Figure 5A:
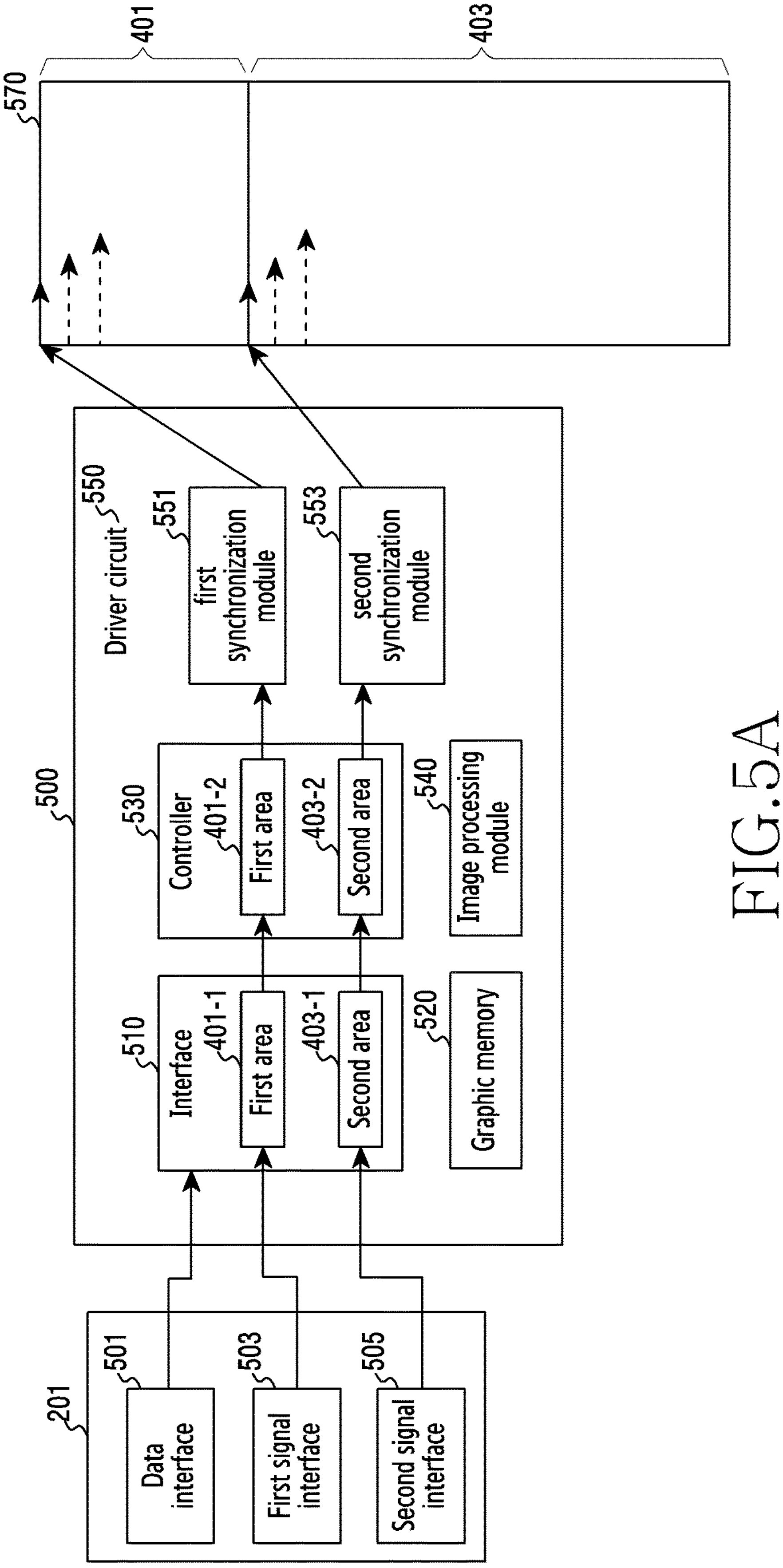
FIG. 5A illustrates a structure for controlling a screen refresh rate for each display area of an electronic device according to an embodiment of the disclosure.

FIG. 5A illustrates a structure for controlling a screen refresh rate for each display area of an electronic device according to an embodiment of the disclosure.

Referring to FIG. 5A, an electronic device according to various embodiments (e.g., the electronic device 100 of FIGS. 1A and 1B) may include the processor 210, a DDI 500, and a display panel 570. According to an embodiment of the disclosure, the processor 210 may include a data interface 501, a first signal interface 503, and a second signal interface 505. According to an embodiment of the disclosure, the data interface 501 may transmit to the DDI 500 image data of a user interface to be displayed on the display panel 570. According to an embodiment of the disclosure, the data interface 501 may correspond to a transmission block of a mobile industry processor interface (MIPI). As another example, the data interface 501 may correspond to a transmission block of a mobile industry processor interface (MDDI) interface or a transmission block of a serial peripheral interface bus (SPI) interface. According to an embodiment of the disclosure, the first signal interface 503 may transmit a first signal to the DDI 500 in association with a first area 401 of the display panel 570. According to an embodiment of the disclosure, the first signal (or a tearing effect (TE) signal) may include a first screen refresh rate (or a display driving frequency) corresponding to a first area 401-1, as a signal related to a display driving frequency (e.g., a frequency setting, a frequency start, a frequency end) corresponding to the first area 401. According to an embodiment of the disclosure, the second signal interface 505 may transmit a second signal to the DDI 500 in association with a second area 403 of the display panel 570. According to an embodiment of the disclosure, the second signal may include a second screen refresh rate corresponding to a second area 403-1, as a signal related to the display driving frequency (e.g., a frequency setting, a frequency start, a frequency end) corresponding to the second area 403-1.

According to an embodiment of the disclosure, the processor 210 may create a user interface to be displayed on the display panel 570, and may determine a screen refresh rate, based on the created user interface. According to an embodiment of the disclosure, the user interface may include a text or an image in association with the first area 401 of the display panel 570, and may include a video in association with the second area 403 of the display panel 570. According to an embodiment of the disclosure, based on the user interface, the electronic device 100 may set a first screen refresh rate (e.g., 30 Hz) in association with the first area 401 of the display panel 570, and may set a second screen refresh rate (e.g., 60 Hz) in association with the second area 403 of the display panel 570. According to an embodiment of the disclosure, the processor 210 may transmit the first signal to the DDI 500 by including the set first screen refresh rate, and may transmit the second signal to the DDI 500 by including the set second screen refresh rate.

According to an embodiment of the disclosure, the DDI 500 may include an interface 510, graphic memory 520, a controller 530, an image processing module 540, or a driver circuit 550. According to an embodiment of the disclosure, the interface 510 may receive image data from the processor 210. According to an embodiment of the disclosure, the interface 510 may include a reception block of an MIPI. According to an embodiment of the disclosure, the image data may include still image data or moving image data (or video data). According to an embodiment of the disclosure, the interface 510 may receive the first signal corresponding to the first area 401-1 from the processor 210, and may receive the second signal corresponding to the second area 403-1. According to an embodiment of the disclosure, the interface 510 may transfer to the graphic memory 520 or the controller 530 the image data received from the processor 201.

According to an embodiment of the disclosure, the graphic memory 520 may store the image data received through the interface 510. For example, the graphic memory 520 may buffer the received image data before transmitting the data to another component (e.g., the image processing module 540, the driver circuit 550). According to an embodiment of the disclosure, the graphic memory 520 may transmit the stored image data to the image processing module 540. The image processing module 540 may process the image data to improve quality of the image data. According to various embodiments of the disclosure, the DDI 500 may include one or more image processing modules 540. According to an embodiment of the disclosure, the image processing module 540 may transfer the processed image data to the driver circuit 550.

According to an embodiment of the disclosure, the controller 530 may control an operation of the DDI 500. The controller 530 may include a timing controller for signal synchronization when processing the image data. According to an embodiment of the disclosure, the controller 530 may transfer to the driver circuit 550 a first control signal which allows to operate at a first screen refresh rate in association with a first area 401-2, and may transfer to the driver circuit 550 a second control signal which allows to operate at a second screen refresh rate in association with a second area 403-2.

According to an embodiment of the disclosure, the driver circuit 550 may be driven under the control of the controller 530. The driver circuit 550 may include a first synchronization module 551, a second synchronization module 553, or a driver. The first synchronization module 551 may synchronize a signal to be transmitted to the driver according to the first screen refresh rate corresponding to the first area 401. The second synchronization module 553 may synchronize a signal to be transmitted to the driver according to the second screen refresh rate corresponding to the second area 403, based on the signal synchronized in the first synchronization module 551. When the first screen refresh module and the second screen refresh module are different from each other, the signals may be synchronized based on different criteria. In order to drive different areas (e.g., the first area 401, the second area 403) of the display panel 570 at different screen refresh rates, the driver circuit 550 may include respective synchronization modules corresponding to the areas.

According to an embodiment of the disclosure, the driver may include a gate driver or a source driver (or a data driver) 557. The gate driver may scan and drive scan lines coupled to pixels of the display panel 570. The gate driver may transmit a scan signal through the scan line. The gate driver may transmit a first scan signal in association with the first area 401 of the display panel 570, and may transmit a second scan signal in association with the second area 403 of the display panel 570. The source driver may drive data lines coupled to the pixels of the display panel 570. The source driver may transmit a first data signal in association with the first area 401 of the display panel 570, and may transmit a second data signal in association with the second area 403 of the display panel 570.

According to an embodiment of the disclosure, the first synchronization module 351 may synchronize the first scan signal and first data signal for driving the first area 401 of the display panel 570 at the first screen refresh rate which is set in the processor 210. The second synchronization module 553 may synchronize the second scan signal and second data signal for driving the second area 403 of the display panel 570 at the second screen refresh rate which is set in the processor 210. The second synchronization module 553 may synchronize the second scan signal and the second data signal at the second screen refresh rate by changing the signal synchronized in the first synchronization module 551.

According to an embodiment of the disclosure, the display panel 570 may include a plurality of pixels, and each of the pixels may be coupled to a scan line coupled to the gate driver and a data line coupled to the source driver. The display panel 570 may be driven by a scan signal provided by the gate driver and a data signal provided by the source driver. In the display panel 570, the first area 401 may be driven by the first scan signal and first data signal corresponding to the first area 401, and the second area 403 may be driven by the second scan signal and second data signal corresponding to the second area 403.

Figure 5B:
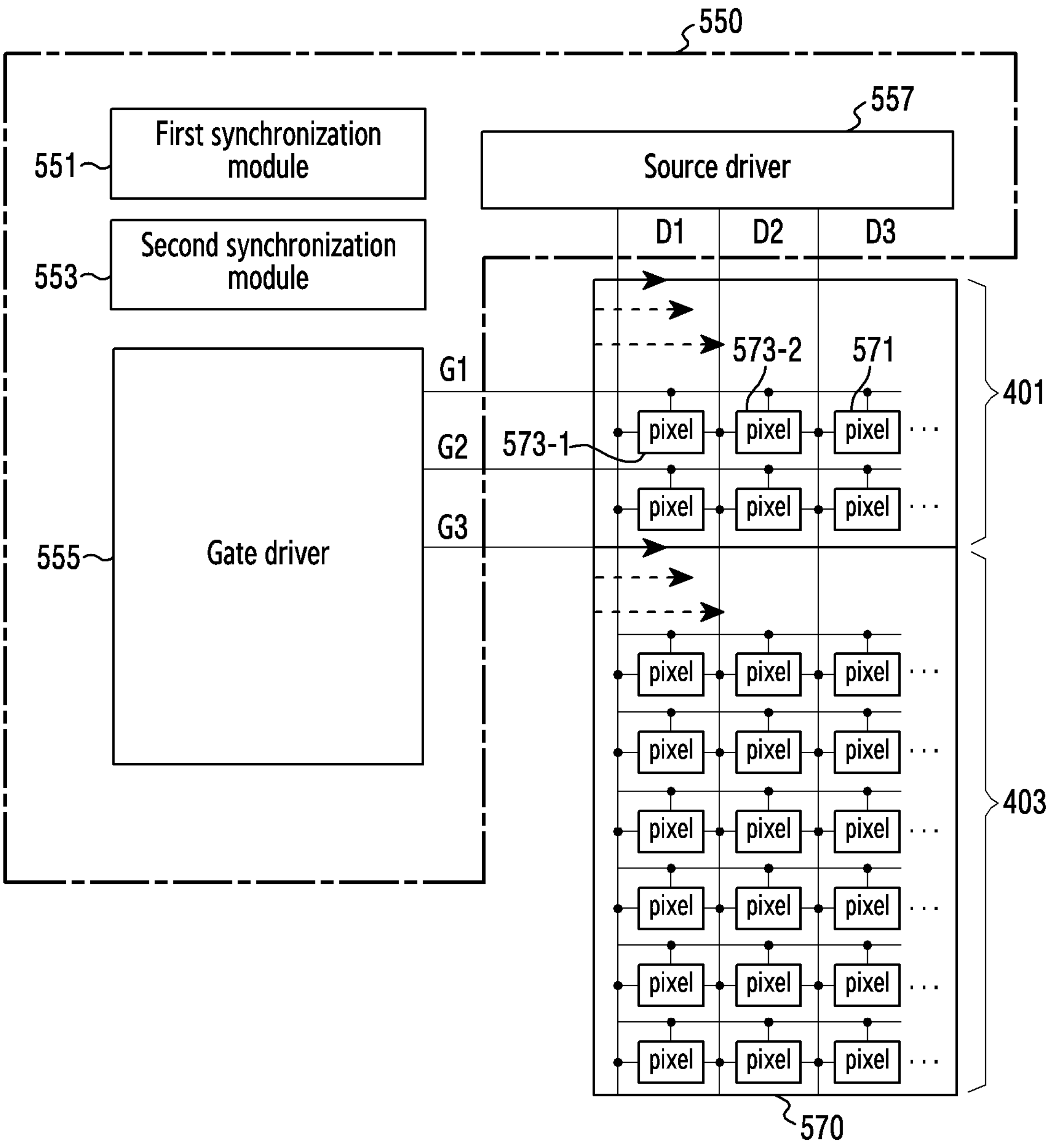
FIG. 5B illustrates a structure of a driver circuit and display panel according to an embodiment of the disclosure.

FIG. 5B illustrates a structure of a driver circuit and display panel according to an embodiment of the disclosure.

Referring to FIG. 5B, the driver circuit 550 may include the first synchronization module 551, the second synchronization module 553, a gate driver 555, and a source driver 557. The display panel 570 may include a plurality of pixels 571. Each of pixels (e.g., 573-1, 573-2) included in the display panel 570 may have scan lines G1, G2, and Gn coupled to the gate driver 555 and data lines D1, D2, and D3 coupled to the source driver 557.

According to an embodiment of the disclosure, the gate driver 555 may transmit a first scan signal in association with the first area 401 of the display panel 570 through the scan line, and may transmit a second scan signal in association with a second area 403 of the display panel 570. The source driver 557 may transmit a first data signal in association with the first area 401 of the display panel 570 through the data line, and may transmit a second data signal in association with the second area 403 of the display panel 570.

Figure 5C:
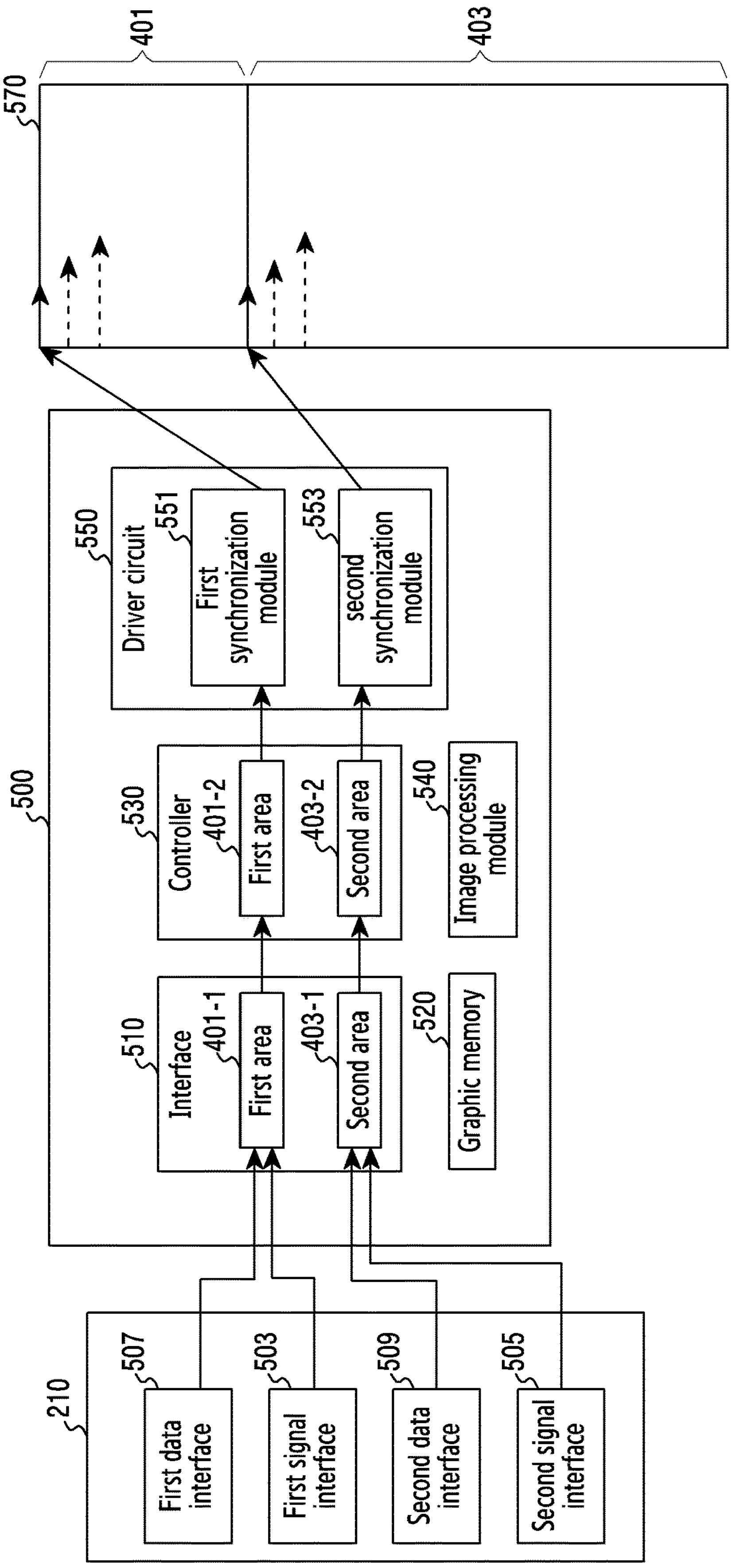
FIG. 5C illustrates a structure for controlling a screen refresh rate for each display area of an electronic device according to an embodiment of the disclosure.

FIG. 5C illustrates another structure for controlling a screen refresh rate for each display area of an electronic device according to an embodiment of the disclosure.

Referring to FIG. 5C, an electronic device according to various embodiments (e.g., the electronic device 100 of FIGS. 1A and 1B) may include a processor 210, a DDI 500, and the display panel 570. The processor 210 may include a first data interface 507, a first signal interface 503, a second data interface 509, and a second signal interface 505. The first data interface 507 may transmit first image data of a user interface to be displayed on the first area 401 of the display panel 570 to the DDI 500. The second data interface 509 may transmit second image data of a user interface to be displayed on a second area 403 of the display panel 570 to the DDI 500. The first data interface 507 and the second data interface 509 may correspond to a transmission block of an RGB interface.

According to an embodiment of the disclosure, the first signal interface 503 may transmit a first signal to the DDI 500 in association with the first area 401 of the display panel 570. The first signal may include a first screen refresh rate (or a display driving frequency) corresponding to the first area 401, as a frequency change signal. The second signal interface 505 may transmit a second signal to the DDI 500 in association with the second area 403 of the display panel 570. The second signal may include a second screen refresh rate corresponding to the second area 403.

According to an embodiment of the disclosure, the DDI 500 may include the interface 510, the graphic memory 520, the controller 530, the image processing module 540, or the driver circuit 550. The interface 510 may receive image data from the processor 210. The interface 510 may include a reception block of an RGB interface.

FIG. 5C differs only in that the first data interface 507 and the second data interface 509 are used instead of the data interface 501 of FIG. 5A, and remaining components are identical. Therefore, detailed descriptions will be omitted.

Figure 6A:
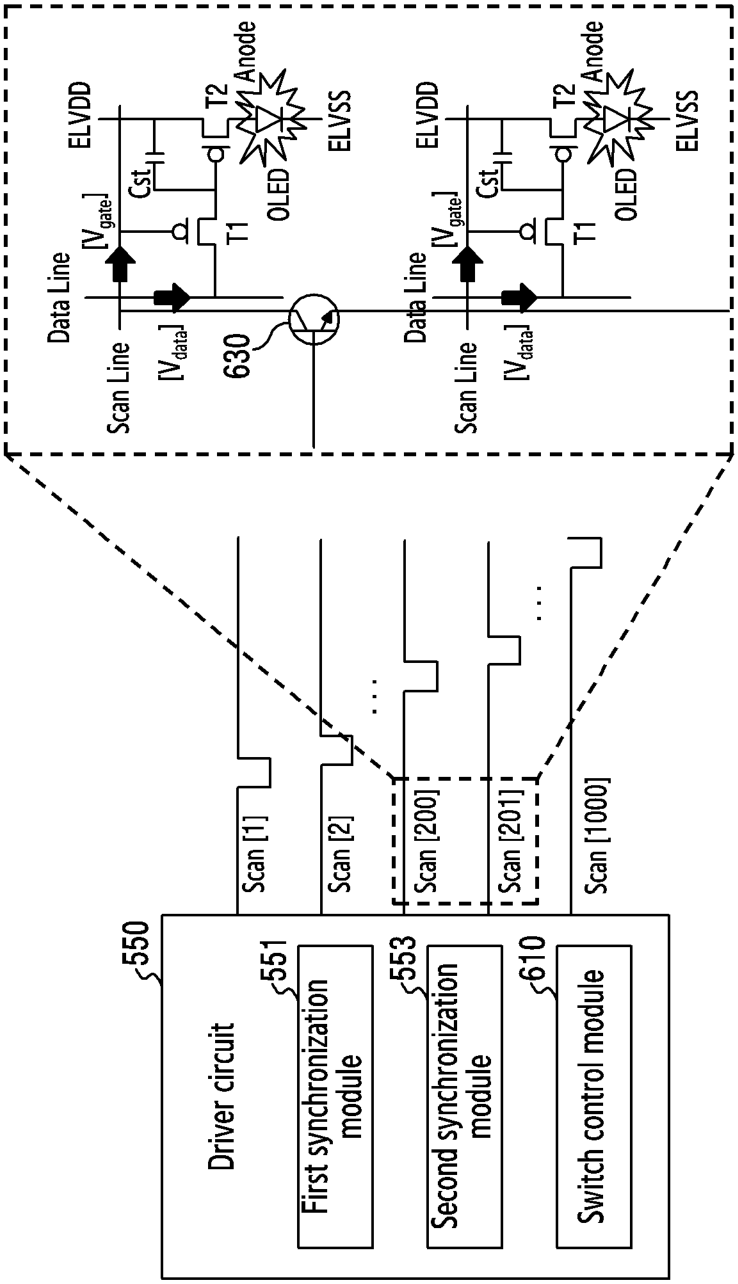
FIG. 6A illustrates a structure in which an electronic device includes a switch circuit according to an embodiment of the disclosure.

FIG. 6A illustrates a structure in which an electronic device includes a switch circuit according to an embodiment of the disclosure.

Referring to FIG. 6A, an electronic device according to various embodiments (e.g., the electronic device 100 of FIGS. 1A and 1B) may include the processor 210, a DDI 500, and the display panel 570. As shown in FIG. 5A, the processor 210 may include the data interface 501, a first signal interface 503, and a second signal interface 505. Alternatively, as shown in FIG. 5C, the processor 210 may include a first data interface 507, the first signal interface 503, a second data interface 509, and the second signal interface 505. Since the processor 210, the DDI 500, and the display panel 570 have been sufficiently described with reference to FIG. 5A, detailed descriptions thereof may be omitted.

According to an embodiment of the disclosure, the DDI 500 may include the interface 510, the graphic memory 520, the controller 530, the image processing module 540, or the driver circuit 550. The driver circuit 550 may include the first synchronization module 551, the second synchronization module 553, and a switch control module 610. Although not shown, the driver circuit 550 may include the gate driver 555 and source driver 557 of FIG. 5B. For example, the gate driver 555 may include the switch control module 610. As another example, the switch control module 610 may include the gate driver 555.

According to an embodiment of the disclosure, the first synchronization module 551 may synchronize a first scan signal and first data signal for driving the first area 401 of the display panel 570 at a first screen refresh rate which is set in the processor 210. The second synchronization module 553 may synchronize a second scan signal and second data signal for driving a second area 403 of the display panel 570 at the second screen refresh rate which is set in the processor 210. The second synchronization module 553 may synchronize the second scan signal and the second data signal at the second screen refresh rate by changing the signal synchronized in the first synchronization module 551. A gate driver (e.g., the gate driver 555 of FIG. 5B) may scan and drive scan lines coupled to pixels of the display panel 570. The gate driver 555 may transmit a scan signal through the scan line. A source driver (e.g., the source driver 557 of FIG. 5B) may drive data lines coupled to pixels of the display panel 570.

According to an embodiment of the disclosure, the electronic device 100 may have a switch circuit 630 between the first area 401 and the second area 403 to drive the first area 401 or second area 403 of the display panel 570 at the same or different screen refresh rate while turning on or off the switch circuit 630. The processor 210 may transfer a control signal which turns on or off the switch circuit 630 to the DDI 500 through the first signal interface 503 or the second signal interface 505.

According to an embodiment of the disclosure, the switch circuit 630 may be disposed between scan lines which are a boundary point between the first and second areas 401 and 403 of the display panel 570. For example, when the first area 401 is from scan lines 1 to 200 and the second area 403 is from scan lines 201 to 1000, the switch circuit 630 may be disposed between the scan line 200 and the scan line 201. A numerical number of the scan line is only an example for helping understanding of the disclosure, and does not limit the disclosure.

According to an embodiment of the disclosure, the controller 530 may control the switch control module 610 included in the driver circuit 550 under the control of the processor 210. The switch control module 610 may control the switch circuit 630 under the control of the controller 530. For example, when the first and second areas 401 and 403 of the display panel 570 are driven at the same screen refresh rate, the switch control module 610 may transmit to the display panel 570 a control signal for turning on the switch circuit 630. When the first and second areas 401 and 403 of the display panel 570 are driven at different screen refresh rates, the switch control module 610 may transmit to the display panel 570 a control signal for turning off the switch circuit 630.

Figure 6B:
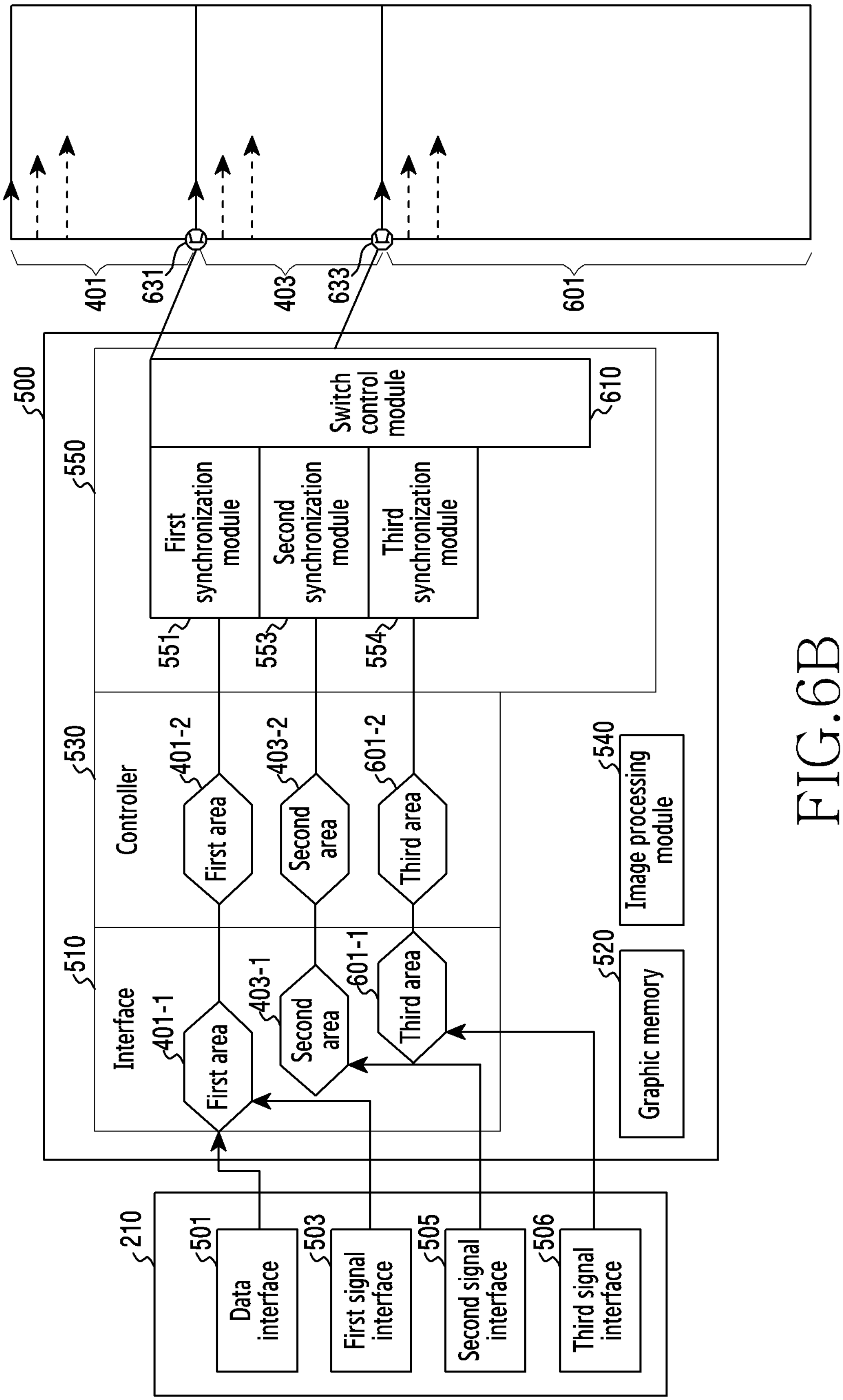
FIG. 6B illustrates a structure in which an electronic device includes a plurality of switch circuits according to an embodiment of the disclosure.

FIG. 6B illustrates a structure in which an electronic device includes a plurality of switch circuits according to an embodiment of the disclosure.

Referring to FIG. 6B, an electronic device according to various embodiments (e.g., the electronic device 100 oaf FIGS. 1A and 1B) may include the processor 210, a DDI 500, and the display panel 570. The processor 210 may include the data interface 501, the first signal interface 503, the second signal interface 505, and a third signal interface 506. Although the structure of the processor 210 of FIG. 6A is illustrated in the figure, as shown in FIG. 5C, the processor 210 may include the first data interface 507, the first signal interface 503, the second data interface 509, the second signal interface 505, a third data interface, and the third signal interface 506.

According to an embodiment of the disclosure, the data interface 501 may transmit image data of a user interface to be displayed on the display panel 570 to the DDI 500. The first signal interface 503 may transmit a first signal to the DDI 500 in association with the first area 401 of the display panel 570. The first signal may include a first screen refresh rate corresponding to the first area 401, as a frequency change signal. The second signal interface 505 may transmit a second signal to the DDI 500 in association with a second area 403 of the display panel 570. The second signal may include a second screen refresh rate corresponding to the second area 403. The third signal interface 506 may transmit a third signal to the DDI 500 in association with a third area 601 of the display panel 570. The third signal may include a third screen refresh rate corresponding to the third area 601.

According to an embodiment of the disclosure, the processor 210 may create a user interface to be displayed on the display panel 570, and may determine a screen refresh rate, based on the created user interface. The user interface may include a text in association with the first area 401, may include a video in association with the second area 403, and may include an image in association with the third area 601. Based on the user interface, the electronic device 100 may set a first screen refresh rate (e.g., 30 Hz) in association with the first area 401, may set a second screen refresh rate (e.g., 60 Hz) in association with the second area 403, and may set a third screen refresh rate (e.g., 30 Hz) in association with the third area 601. The processor 210 may transmit the first signal to the DDI 500 by including the set first screen refresh rate, may transmit the second signal to the DDI 500 by including the set second screen refresh rate, and may transmit the third signal to the DDI 500 by including the set third screen refresh rate. The first screen refresh rate to the third screen refresh rate may be the same as or different from each other.

According to an embodiment of the disclosure, the DDI 500 may include the interface 510, the graphic memory 520, the controller 530, the image processing module 540, or the driver circuit 550. The controller 530 may control an operation of the DDI 500. According to an embodiment of the disclosure, the controller 530 may transfer to the driver circuit 550 a first control signal which allows to operate at a first screen refresh rate in association with a first area 401-2, may transfer to the driver circuit 550 a second control signal which allows to operate at a second screen refresh rate in association with a second area 403-2, and may transfer to the driver circuit 550 a third control signal which allows to operate at a third screen refresh rate in association with a third area 601-2.

According to an embodiment of the disclosure, the driver circuit 550 may be driven under the control of the controller 530. The driver circuit 550 may include the first synchronization module 551, the second synchronization module 553, a third synchronization module 554, and the switch control module 610. Although not shown, the driver circuit 550 may include the gate driver 555 and source driver 557 of FIG. 5B.

According to an embodiment of the disclosure, the first synchronization module 551 may synchronize a first scan signal and first data signal for driving the first area 401 of the display panel 570 at a first screen refresh rate which is set in the processor 210. The second synchronization module 553 may synchronize a second scan signal and second data signal for driving the second area 403 of the display panel 570 at the second screen refresh rate which is set in the processor 210. The second synchronization module 553 may synchronize the second scan signal and the second data signal at the second screen refresh rate by changing the signal synchronized in the first synchronization module 551. The third synchronization module 554 may synchronize a third scan signal and third data signal for driving a third area 601-1 of the display panel 570 at the third screen refresh rate which is set in the processor 210. The third synchronization module 554 may synchronize the third scan signal and the third data signal at the third screen refresh rate by changing the signal synchronized in the first synchronization module 551.

According to an embodiment of the disclosure, the display panel 570 may include a first switch circuit 631 disposed between the first area 401 and the second area 403, a second switch circuit 633, and a third switch circuit 635 disposed between the second area 403 and the third area 601-1. The processor 210 may drive the first area 401, second area 403-1, or third area 601-1 of the display panel 570 at the same or different screen refresh rate while turning on or off the first switch circuit 631 or the second switch circuit 633 or the third switch circuit 635. The gate driver 555 may scan and drive scan lines coupled to pixels of the display panel 570. The gate driver 555 may transmit a scan signal through the scan line. The source driver 557 may drive data lines coupled to the pixels of the display panel 570.

According to an embodiment of the disclosure, the first switch circuit 631 may be disposed between scan lines which are a boundary point between the first area 401 and the second area 403. For example, when the first area 401 is from scan lines 1 to 200, the second area 403 is from scan lines 201 to 500, and the third area 601-1 is from scan lines 501 to 1000, the first switch circuit 631 may be disposed between the scan line 200 and the scan line 201, and the second switch circuit 633 may be disposed between the scan line 500 and the scan line 201.

According to an embodiment of the disclosure, the controller 530 may control the switch control module 610 included in the driver circuit 550 under the control of the processor 210. The switch control module 610 may control the first switch circuit 631 or the second switch circuit 633 under the control of the controller 530. For example, when the first area 401-1 to third area 601-1 of the display panel 570 are driven at the same screen refresh rate, the switch control module 610 may transmit to the display panel 570 a control signal for turning on the first switch circuit 631 and the second switch circuit 633. When the first area 401 and the second area 403 operate at the same screen refresh rate and the second area 403 and the third area 601-1 operate at different screen refresh rates, the switch control module 610 may transmit to the display panel 570 a control signal for turning on the first switch circuit 831 and turning off the second switch circuit 633. When the first area 401 and the second area 403 operate at different screen refresh rates and the second area 403 and the third area 601-1 operate at the same screen refresh rate, the switch control module 610 may transmit to the display panel 570 a control signal for turning off the first switch circuit 631 and turning on the second switch circuit 633. When the first area 410 to the third area 601-1 operate at different screen refresh rates, the switch control module 610 may transmit to the display panel 570 a control signal for turning off the first switch circuit 631 and the second switch circuit 633.

Figure 6C:
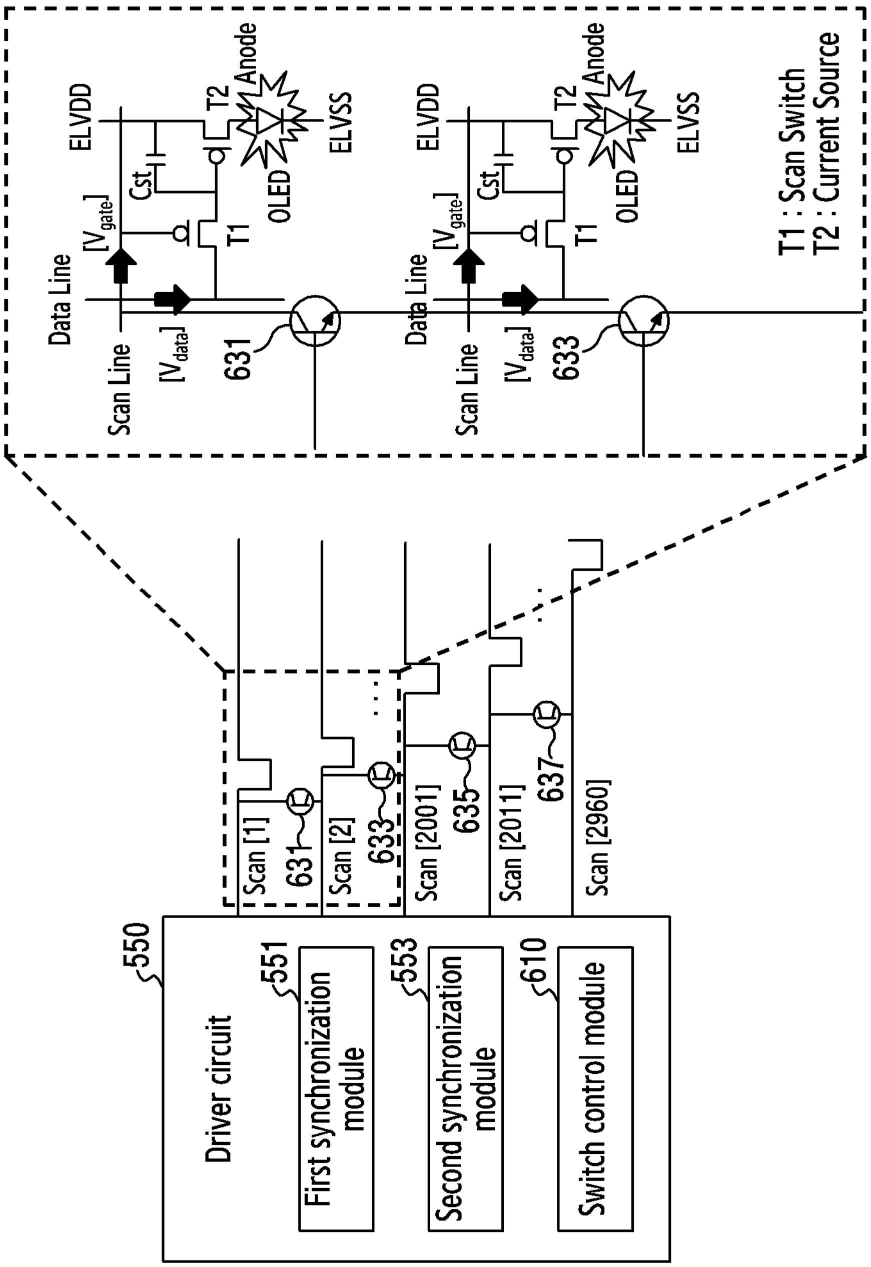
FIG. 6C illustrates a structure of a driver circuit and display panel according to an embodiment of the disclosure.

FIG. 6C illustrates a structure of a driver circuit and display panel according to an embodiment of the disclosure.

Referring to FIG. 6C, the driver circuit 550 may include a plurality of synchronization modules (e.g., the first synchronization module 551, the second synchronization module 553, and/or the switch control module 610). The display panel 570 may include a switch circuit between two scan lines. For example, the display panel 570 may include the first switch circuit 631 between a first scan line (scan 1) and a second scan line (scan 2), may include the second switch circuit 633 between the second scan line (scan 2) and a third scan line (scan 3), may include a $2001^{st}$ switch circuit between a $2001^{st}$ scan line (scan 2001) and a $2002^{nd}$ scan line, and may include an $n^{th}$ switch circuit 637 between a $2011^{st}$ scan line (scan 2011) and a $2012^{nd}$ scan line. When 1 to 2960 scan lines are present in the display panel 570, since a switch circuit is disposed between two scan lines, 2959 switch circuits may be included in total.

According to an embodiment of the disclosure, the processor 210 may be driven at the same or different screen refresh rates for each scan line of the display panel 570 while turning on or off a plurality of switch circuits (e.g., the first switch circuit 631 to the $n^{th}$ switch circuit 637). Similarly to the first area 401 and second area 403 of the display panel 570, the processor 210 may set the screen refresh rate differently for each area desired by a user in the entire area of the display panel 570, instead of setting the screen refresh rate in association with a specified area.

According to an embodiment of the disclosure, the processor 210 may create a user interface to be displayed on the display panel 570, and may determine a screen refresh rate, based on the created user interface. The processor 210 may determine the screen refresh rate, based on a user interface and a size of the display panel 570. For example, the user interface may include a text from the first scan line to the $200^{th}$ scan line (e.g., a first area), may include a video from the $201^{st}$ scan line to the $500^{th}$ scan line (e.g., a second area), may include an image from the $501^{st}$ scan line to the $1500^{th}$ scan line (e.g., the third area 601-1), and may include a video from the $1501^{st}$ scan line to the $2960^{th}$ scan line (e.g., a fourth area). Based on the user interface, the processor 210 may set a first screen refresh rate in association with the first area, may set a second screen refresh rate in association with the second area, may set a third screen refresh rate in association with the third area 601-1, and may set a fourth screen refresh rate in association with the fourth area.

According to an embodiment of the disclosure, the processor 210 may transmit a first signal to a DDI 500 by including the set first screen refresh rate, may transmit a second signal to the DDI 500 by including the set second screen refresh rate, may transmit a third signal to the DDI 500 by including the set third screen refresh rate, and may transmit a fourth signal to the DDI 500 by including the set fourth screen refresh rate. The first screen refresh rate to the fourth screen refresh rate may be the same as or different from each other. According to various embodiments of the disclosure, the processor 210 may have the DDI 500 coupled to interfaces which transmit respective signals.

According to various embodiments of the disclosure, the driver circuit 550 may include a synchronization module in association with a switch circuit. For example, when 2959 switch circuits are included in the display panel 570, the driver circuit 550 may include 2960 synchronization modules. In order to drive a display area identified by the switch circuit, the number of synchronization modules may be greater than the number of switch circuits. For example, the number of synchronization modules may be greater by 1 than the number of switch circuits. Alternatively, the driver circuit 550 may include more than two synchronization modules to synchronize a scan signal of a gate driver and a data signal of a source driver. The first synchronization module 551 may synchronize a first scan signal and first data signal for driving a first area of the display panel 570 at a first screen refresh rate which is set in the processor 210. The second synchronization module 553 may synchronize a second scan signal and second data signal for driving a second area of the display panel 570 at a second screen refresh rate which is set in the processor 210. The second synchronization module 553 may change a signal synchronized in the first synchronization module 551 to synchronize the second scan signal and the second data signal at the second screen refresh rate. The second synchronization module 553 or a third synchronization module (not shown) may synchronize a third scan signal or third data signal for driving a third area of the display panel 570 at a third screen refresh rate which is set in the processor 210. The third synchronization module (not shown) and a fourth synchronization module (not shown) may synchronize a fourth scan signal and fourth data signal for driving a fourth area of the display panel 570 at a fourth screen refresh rate which is set in the processor 210.

According to an embodiment of the disclosure, the controller 530 may control the switch control module 610 included in the driver circuit 550 under the control of the processor 210. The switch control module 610 may control a plurality of switch circuits (e.g., the first switch circuit 631 to the $n^{th}$ switch circuit 637) under the control of the controller 530. For example, when the entire area of the display panel 570 is driven at the same screen refresh rate, the switch control module 610 may transmit to the display panel 570 a control signal for turning on the plurality of switch circuits (e.g., the first switch circuit 631 to the $n^{th}$ switch circuit 637). When the first area to the fourth area are driven at different screen refresh rates, the switch control module 610 may transmit to the display panel 570 a control signal for turning off the $200^{th}$ switch circuit disposed between the first area (e.g., from the $1^{st}$ scan line to the $200^{th}$ scan line) and the second area (e.g., from the $201^{st}$ scan line to the $500^{th}$ scan line), the $1499^{th}$ switch circuit disposed between the second area and the third area (e.g., from the $501^{st}$ scan line to the $1500^{th}$ scan line), and the $1500^{th}$ switch circuit disposed between the third area and the fourth area (e.g., $1501^{st}$ scan line to the $2960^{th}$ scan line).

Figure 7:
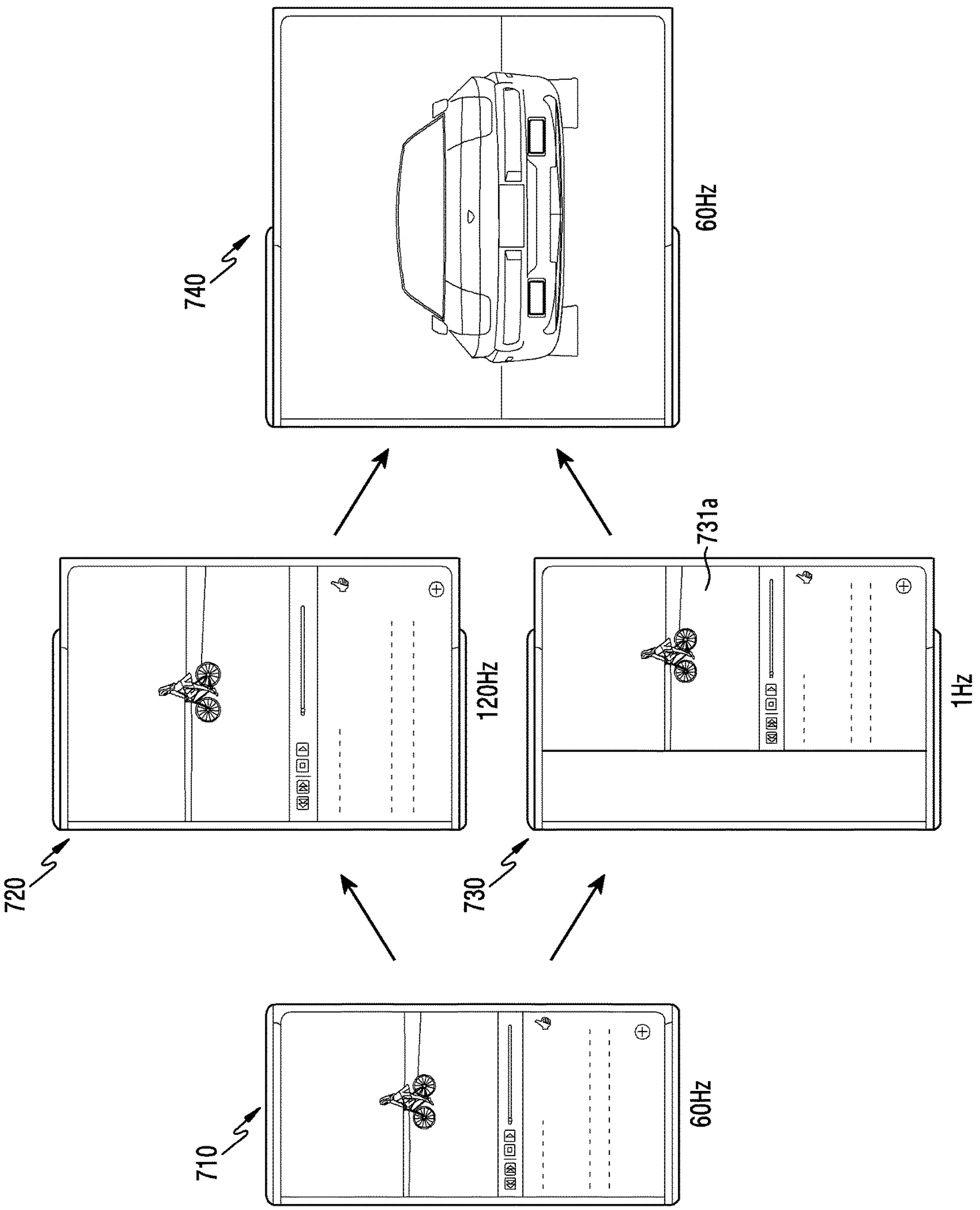
FIG. 7 illustrates an electronic device which changes a scan rate of a display depending on a state change according to an embodiment of the disclosure.

FIG. 7 illustrates an electronic device which changes a scan rate of a display depending on a state change according to an embodiment of the disclosure.

In the description of FIG. 7, similar or redundant descriptions may be simplified or omitted.

Referring to FIG. 7, the processor 210 according to an embodiment may output a first screen 710 through the display 120 in a first state (e.g., the first state 100*a* of FIG. 1A). According to an embodiment of the disclosure, the processor 210 may display content, such as a moving image or an execution screen of an application on the first screen 710. According to an embodiment of the disclosure, the processor 210 may display the content on the first screen 710 at a first scan rate (e.g., 60 Hz). For example, the content displayed on the screen may mean content in which there is screen movement within a specified threshold time.

According to an embodiment of the disclosure, the processor 210 may determine a state of the electronic device 100 through the sensor 230. For example, the processor 210 may use at least one of an optical sensor, a capacitive sensor, a hall sensor, and an inertial sensor to determine a size of a display exposed to the outside, and thus may determine the state of the electronic device 100 as a state of being extended.

According to an embodiment of the disclosure, the processor 210 may output a second screen 720 to the display 120 while the electronic device 100 is extended. According to an embodiment of the disclosure, the processor 210 may display content on the second screen 720 at a second scan rate (e.g., 120 Hz). According to the aforementioned embodiment of the disclosure, the electronic device 100 may temporarily change to a high scan rate (e.g., 120 Hz) while the electronic device 100 is extended to support improvement of screen quality.

According to another embodiment of the disclosure, the processor 210 may output a third screen 730 to the display 120 while the electronic device 100 is extended. According to an embodiment of the disclosure, when a dynamic image is being reproduced on the first screen 710, the processor 210 may pause the image being reproduced upon detecting the extension of the electronic device 100. According to an embodiment of the disclosure, the processor 210 may output the image to a first area 731*a* of the display area exposed to the outside without having to change a size of an execution screen in the first screen 710 in a state where the image is paused.

According to an embodiment of the disclosure, the processor 210 may control the display 120 so that temporarily paused content is displayed at a third refresh rate (e.g., 1 Hz) lower than the first refresh rate. According to the aforementioned embodiment of the disclosure, the electronic device 100 may save current consumption by changing to a low scan rate (e.g., 1 Hz) while the electronic device 100 is expanded.

According to an embodiment of the disclosure, the processor 210 may determine the state of the electronic device 100 as an extension complete state. For example, the processor 210 may determine that the electronic device 100 is in a fully extended state through a hall sensor. Alternatively, when a state change is not detected through the sensor 230 within a specified time, it may be determined that the extension is complete.

According to an embodiment of the disclosure, the processor 210 may output a fourth screen 740 through the display 120 in a state where the extension of the electronic device 100 is complete. According to an embodiment of the disclosure, the processor 210 may control the display 120 so that content displayed at the second scan rate higher than the first scan rate while the electronic device 100 is extended is displayed again on the fourth screen 740 at the first scan rate.

According to another embodiment of the disclosure, the processor 210 may reproduce and display again the content temporarily paused while the electronic device 100 is extended on the fourth screen 740. According to an embodiment of the disclosure, the processor 210 may control the display 120 so that content displayed at the third scan rate lower than the first scan rate while the electronic device 100 is extended is displayed again on the fourth screen 740 at the first scan rate.

Figure 8:
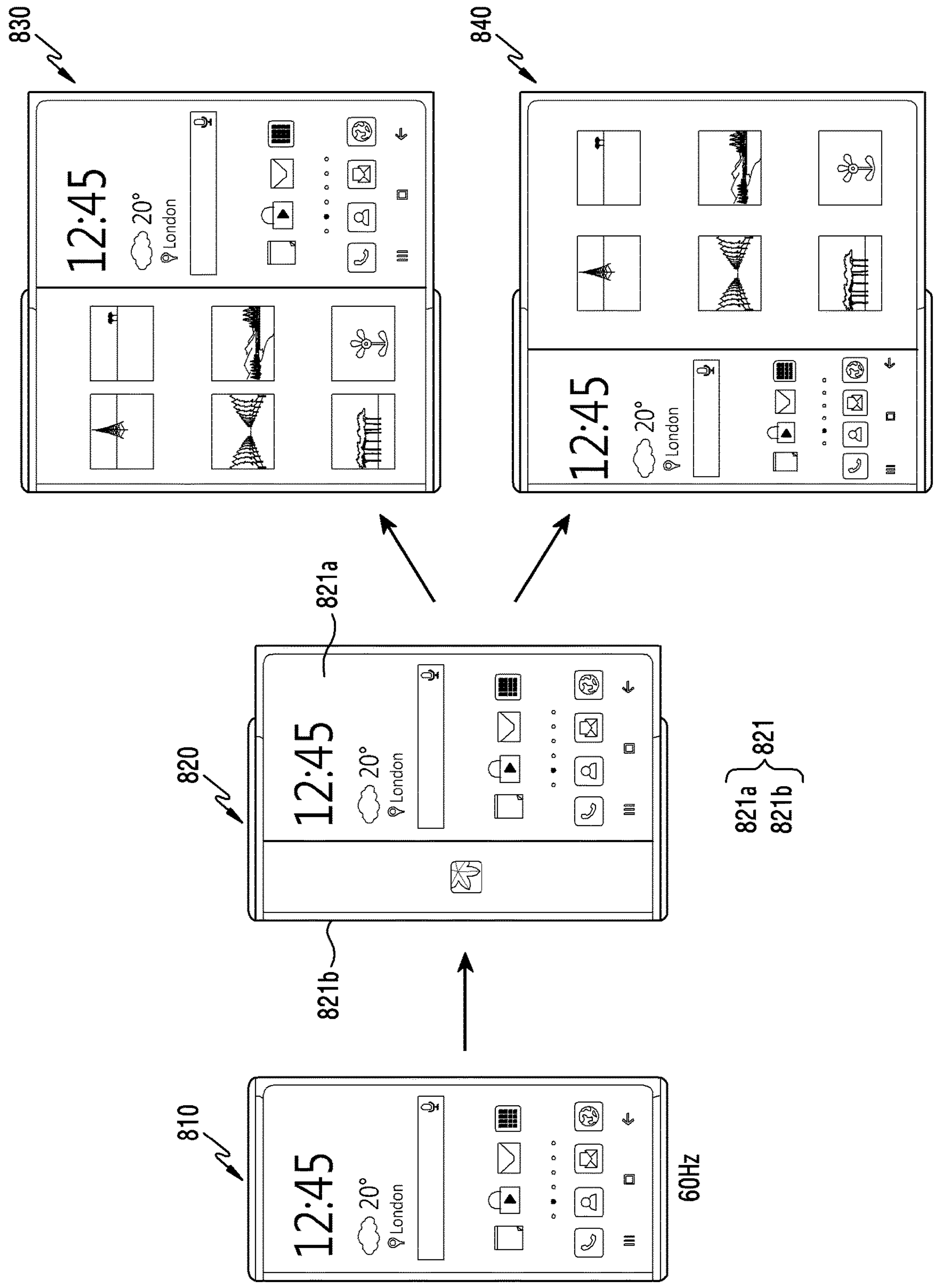
FIG. 8 illustrates an electronic device which displays a plurality of execution screens depending on a state change and changes a scan rate of a display according to an embodiment of the disclosure.

FIG. 8 illustrates an electronic device which displays a plurality of execution screens depending on a state change and changes a scan rate of a display according to an embodiment of the disclosure.

Referring to FIG. 8, the processor 210 according to an embodiment may output a first screen 810 through the display 120 in a first state (e.g., the first state 100*a* of FIG. 1A). According to an embodiment of the disclosure, the processor 210 may display content, such as a home screen or an image on the first screen 810. According to an embodiment of the disclosure, the processor 210 may display the content on the first screen 810 at a first scan rate (e.g., 60 Hz). For example, the content displayed on the screen may mean content in which there is screen movement within a specified threshold time.

According to an embodiment of the disclosure, the processor 210 may determine a state of the electronic device 100 through the sensor 230. For example, the processor 210 may use at least one of an optical sensor, a capacitive sensor, a hall sensor, and an inertial sensor to determine a size of a display exposed to the outside, and thus may determine the state of the electronic device 100 as a state of being extended.

According to an embodiment of the disclosure, the processor 210 may output a second screen 820 to the display 120 while the electronic device 100 is extended. According to an embodiment of the disclosure, the processor 210 may display a plurality of execution screens on the second screen 820. According to an embodiment of the disclosure, the processor 210 may display first content on a first area 821*a* of the display area 821 exposed to the outside, and may display second content on a second area 821*b* which is drawn out when the electronic device 100 is extended. According to an embodiment of the disclosure, the second content may include at least one of an icon, a text, and the entirety or part of content to be provided.

According to an embodiment of the disclosure, the processor 210 may dynamically change a scan rate for a plurality of execution screens. According to an embodiment of the disclosure, the processor 210 may display content on the second screen 820 at a second scan rate (e.g., 1 Hz) lower than the first scan rate. According to another embodiment of the disclosure, the processor 210 may display the content on the second screen 820 at a third scan rate (e.g., 120 Hz) higher than the first scan rate. According to an embodiment of the disclosure, the processor 210 may display each content at a different scan rate. For example, the processor 210 may provide control such that a first area 821*a* on which first content is displayed operates at the first scan rate, and such that the second area 821*b* on which second content is displayed operates at the second scan rate.

According to an embodiment of the disclosure, the processor 210 may determine the state of the electronic device 100 as an extension complete state. For example, the processor 210 may determine that the electronic device 100 is a fully extended state through a hall sensor. Alternatively, when a state change is not detected through the sensor 230 within a specified time, it may be determined that the extension is complete.

According to an embodiment of the disclosure, the processor 210 may output a third screen 830 through the display 120 in a state where the extension of the electronic device 100 is complete. According to an embodiment of the disclosure, the processor 210 may control the display 120 so that content displayed at the second scan rate higher than the first scan rate while the electronic device 100 is extended is displayed again on the third screen 830 at the first scan rate. According to another embodiment of the disclosure, the processor 210 may control the display 120 so that content displayed at the third scan rate lower than the first scan rate while the electronic device 100 is extended is displayed again on the third screen 830 at the first scan rate. According to an embodiment of the disclosure, the processor 210 may control the display 120 to selectively change the scan rate of content. According to an embodiment of the disclosure, the processor 210 may change the scan rate of the second content without having to change the scan rate of the first content. For example, the first content may mean content in which there is no change while the electronic device 100 is extended, and the second content may mean content in which a UI changes while the electronic device 100 is extended.

According to an embodiment of the disclosure, the processor 210 may change a layout of a window in which a plurality of execution screens are displayed on a fourth screen 840 as illustrated. According to an embodiment of the disclosure, the processor 210 may adjust a position of at least one execution screen upon determining that the electronic device 100 is extended. For example, the processor 210 may change the position of the execution screen, based on a user setting or a pre-set position after controlling a display to change the scan rate.

Figure 9:
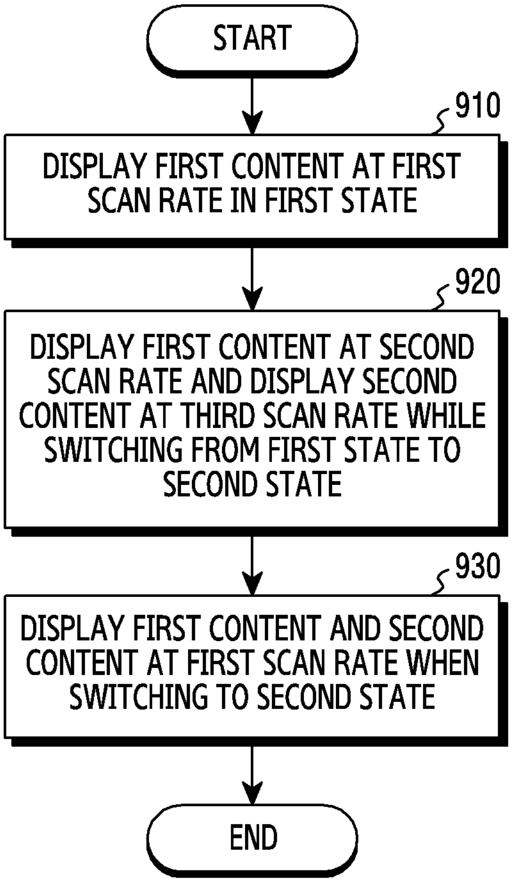
FIG. 9 is a flowchart in which an electronic device controls a scan rate of a display according to an embodiment of the disclosure.

FIG. 9 is a flowchart in which an electronic device controls a scan rate of a display according to an embodiment of the disclosure.

In the description of FIG. 9, similar or redundant descriptions may be simplified or omitted.

Referring to FIG. 9, in operation 910, a processor according to an embodiment (e.g., the processor 210 of FIG. 2) may display first content on the display 120 at a first scan rate when the electronic device 100 is in a first state (e.g., the first state 100*a* of FIG. 1A).

According to an embodiment of the disclosure, the processor 210 may dynamically change a scan rate, based on content which is output to the display 120. According to an embodiment of the disclosure, the processor 210 may control the display 120 to operate at a high scan rate (e.g., 120 Hz) when dynamic content is displayed on the display 120. For example, the dynamic content may mean an execution screen of which a screen moves within a specified threshold time, such as game content or a moving image. As another example, the processor 210 may control the display 120 to operate at a low scan rate (e.g., 1 Hz) when the static content is output to the display 120 or when in an AOD mode. For example, the static content may mean content of which a screen does not change within a specified threshold time, such as a home screen or an image or of which an area to be changed is less than a specified ratio.

According to an embodiment of the disclosure, in operation 920, the processor 210 may output first content and second content different from the first content through the display 120 while the electronic device 100 switches from the first state 100*a* to a second state (e.g., the second state 100*b* of FIG. 1B). According to an embodiment of the disclosure, the processor 210 may detect a state change of the electronic device 100 through the sensor 230.

According to an embodiment of the disclosure, the processor 210 may provide a scan rate by varying the scan rate for each area of the display 120. For example, an area where the first content is output may change at a second scan rate (e.g., 120 Hz) higher than a first scan rate (e.g., 60 Hz), and an area where the second content is output may change at a third scan rate (e.g., 1 Hz) lower than the first scan rate. According to an embodiment of the disclosure, the processor 210 may determine the scan rate, based on an attribute of content to be output. For example, when the content is dynamic content in which there is movement within a specified threshold time, the scan rate may be changed to the second scan rate. As another example, when the content is static content in which there is no movement within the specified threshold, the scan rate may be changed at the third scan rate.

According to an embodiment of the disclosure, in operation 930, the processor 210 may control the display 120 to operate at the first scan rate when the electronic device 100 switches to the second state 100*b*. According to an embodiment of the disclosure, the processor 210 may determine an extension state of the electronic device 100 through the sensor 230. According to an embodiment of the disclosure, upon determining that the extension of the electronic device 100 is complete, the processor 210 may display the first content and the second content at the first scan rate.

Figure 10:
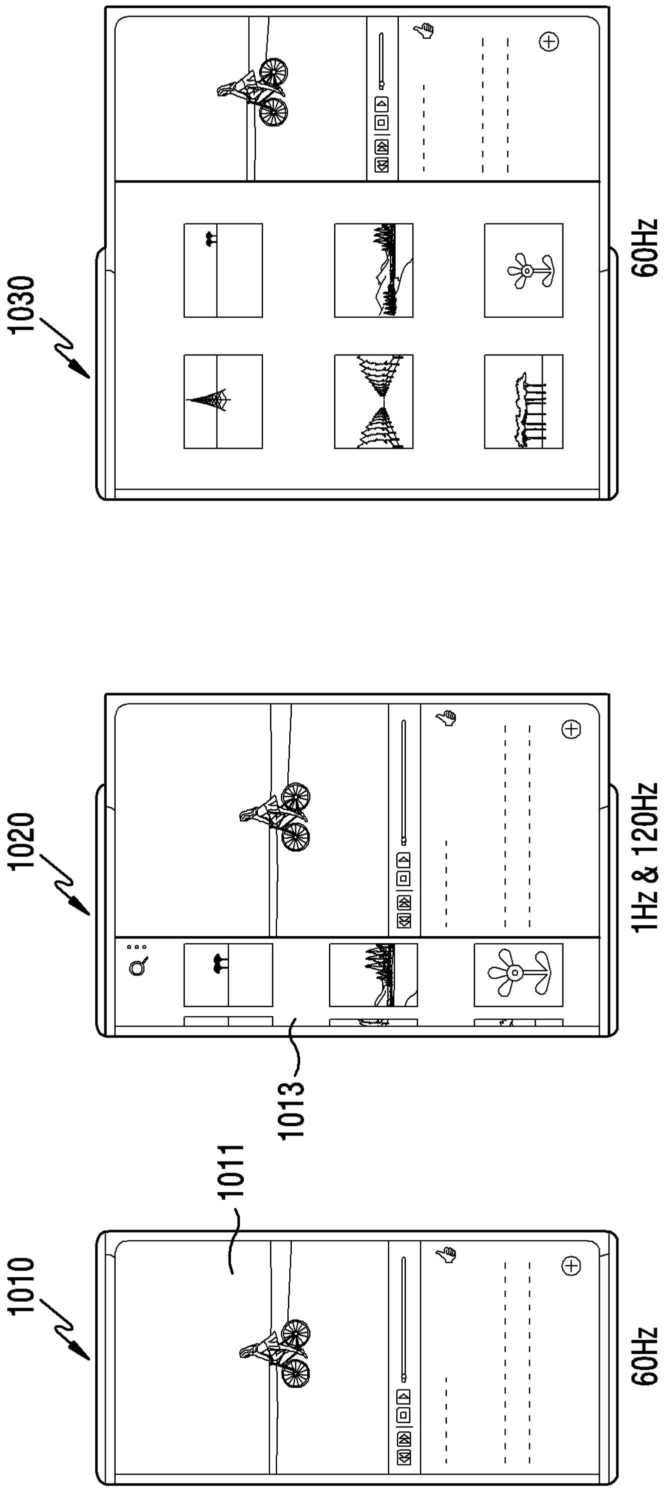
FIG. 10 illustrates an electronic device in which a scan rate is changed differently for each area of a display depending on a state change according to an embodiment of the disclosure.

FIG. 10 illustrates an electronic device in which a scan rate is changed differently for each area of a display depending on a state change according to an embodiment of the disclosure.

Referring to FIG. 10, the processor 210 according to an embodiment may output a first screen 1010 through the display 120 in a first state (e.g., the first state 100*a* of FIG. 1A). According to an embodiment of the disclosure, the processor 210 may display a first content 1011 on the first screen 1010. For example, the first content may mean dynamic content, such as a moving image or a game execution screen. According to an embodiment of the disclosure, the processor 210 may display the content on the first screen 1010 at a first scan rate (e.g., 60 Hz).

According to an embodiment of the disclosure, the processor 210 may determine a state of the electronic device 100 through the sensor 230. For example, the sensor 230 may be at least one of an optical sensor, a capacitive sensor, a hall sensor, and an inertial sensor.

According to an embodiment of the disclosure, the processor 210 may output a second screen 1020 to the display 120 while the electronic device 100 is extended. According to an embodiment of the disclosure, the processor 210 may display the first content 1011 and a second content 1013 on the second screen 1020. For example, the second content may mean static content, such as an image or an icon. According to an embodiment of the disclosure, the processor 210 may display the first content 1011 at a second scan rate (e.g., 120 Hz) higher than a first scan rate, and may display the second content 1013 at a third scan rate (e.g., 1 Hz) lower than the first scan rate.

According to an embodiment of the disclosure, the processor 210 may determine the state of the electronic device 100 as an extension complete state. For example, the processor 210 may determine that the electronic device 100 is in a fully extended state through a hall sensor. Alternatively, when a state change is not detected through the sensor 230 within a specified time, it may be determined that the extension is complete.

According to an embodiment of the disclosure, the processor 210 may output a third screen 1030 through the display 120 in a state where the extension of the electronic device 100 is complete. According to an embodiment of the disclosure, the processor 210 may control the display 120 so that first content 1011 and second content 1013 are displayed again on the third screen 1030 at the first scan rate.

Figure 11:
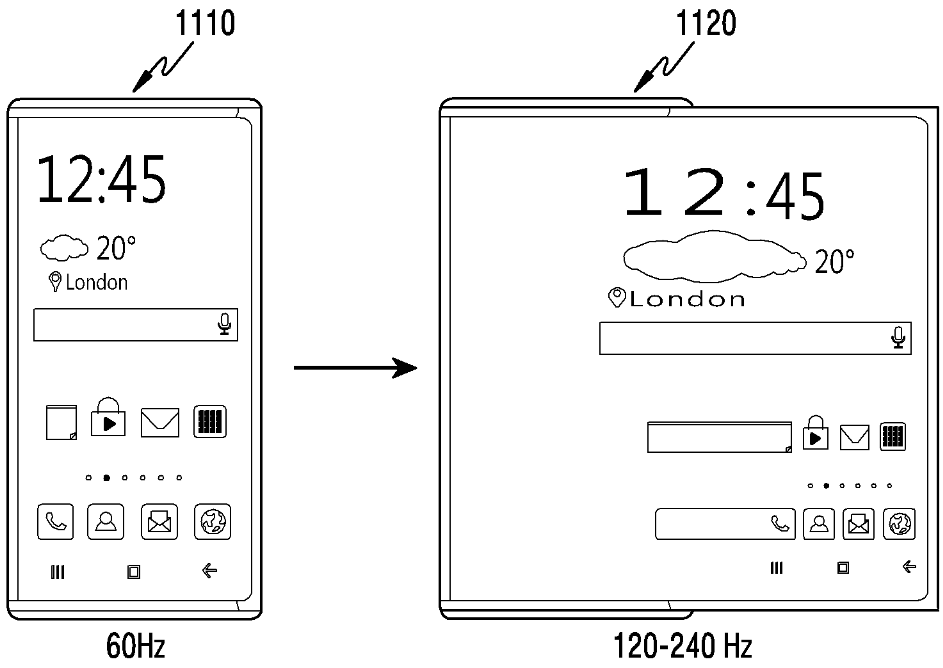
FIG. 11 illustrates an animation effect provided when an electronic device is extended according to an embodiment of the disclosure.

FIG. 11 illustrates an animation effect provided when an electronic device is extended according to an embodiment of the disclosure.

Referring to FIG. 11, the processor 210 according to an embodiment may control the display 120 to operate at a first scan rate (e.g., 60 Hz) in a first screen 1110 as illustrated. According to an embodiment of the disclosure, the processor 210 may provide the animation effect in a second screen 1120, based on a specified setting while the electronic device 100 is extended as illustrated. For example, the specified setting may mean a screen setting, such as a natural mode or a normal mode. In addition, for example, the animation effect may include at least one of a screen enlargement effect or an afterimage effect.

According to an embodiment of the disclosure, the processor 210 may provide a natural effect by changing to a scan rate (e.g., 120 Hz to 240 Hz) higher than the first scan rate while the electronic device 100 is extended. For example, the processor 210 may control the display 120 to operate at a maximum scan rate of the electronic device 100. According to the aforementioned embodiment of the disclosure, the electronic device 100 may provide a user with a feeling that the display is further extended by providing the animation effect.

Figure 12:
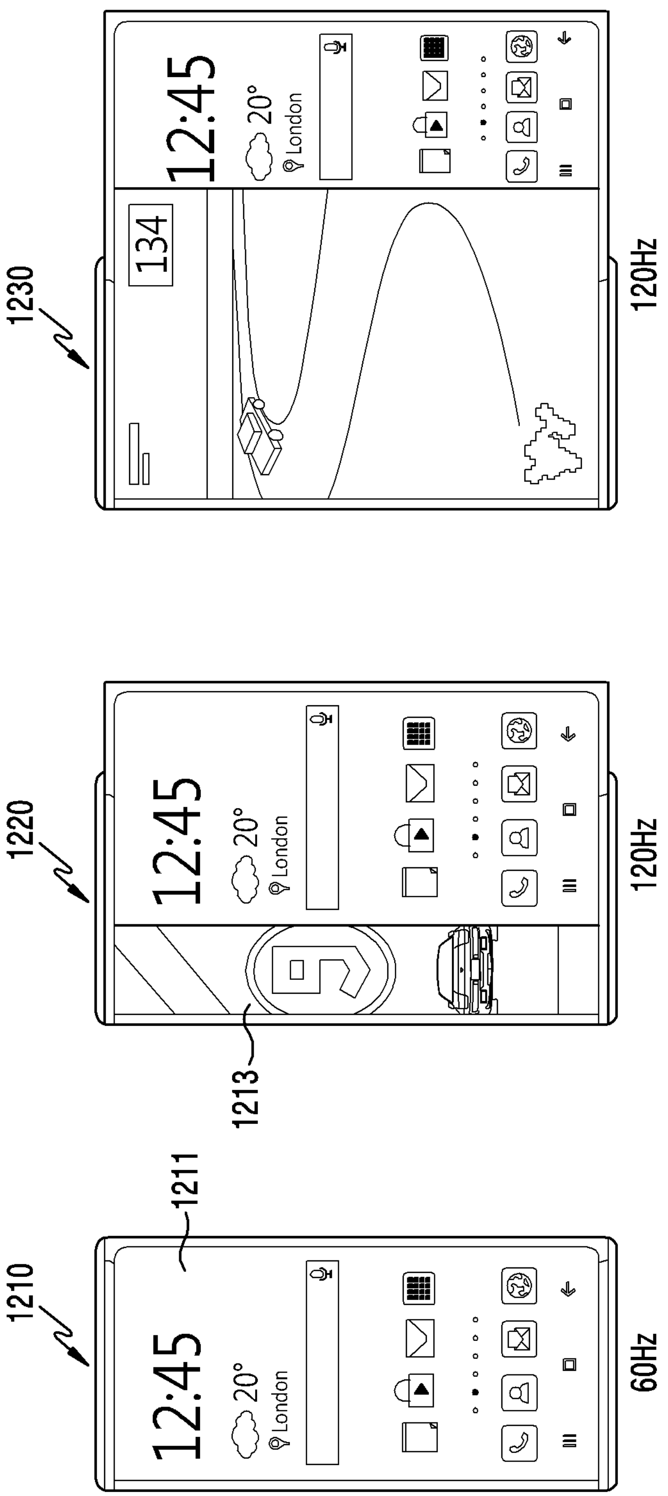
FIG. 12 illustrates an electronic device which controls a scan rate of a display depending on a state change according to an embodiment of the disclosure.

FIG. 12 illustrates an electronic device which controls a scan rate of a display depending on a state change according to an embodiment of the disclosure.

Referring to FIG. 12, the processor 210 according to an embodiment may output a first screen 1210 through the display 120 in a first state (e.g., the first state 100 of FIG. 1A). According to an embodiment of the disclosure, the processor 210 may display a first content 1211 on the first screen 1210. For example, the first content may mean static content, such as a home screen or an image. According to an embodiment of the disclosure, the processor 210 may display the first content 1211 on the first screen 1210 at a first scan rate (e.g., 60 Hz).

According to an embodiment of the disclosure, the processor 210 may determine a state of the electronic device 100 through the sensor 230. For example, the sensor 230 may be at least one of an optical sensor, a capacitive sensor, a hall sensor, and an inertial sensor.

According to an embodiment of the disclosure, the processor 210 may output a second screen 1220 to the display 120 while the electronic device 100 is extended. According to an embodiment of the disclosure, the processor 210 may display the first content 1211 and a second content 1213 on the second screen 1220. For example, the second content 1213 may mean dynamic content, such as a game execution screen or a moving image. According to an embodiment of the disclosure, the processor 210 may display the first content 1211 and the second content 1213 at a second scan rate (e.g., 120 Hz) higher than a first scan rate.

According to an embodiment of the disclosure, the processor 210 may determine the state of the electronic device 100 as an extension complete state. According to an embodiment of the disclosure, the processor 210 may output a third screen 1230 through the display 120 in a state where the extension of the electronic device 100 is complete. According to an embodiment of the disclosure, the processor 210 may control the display 120 so that the first content 1211 and the second content 1213 are continuously displayed on the third screen 1230 at a second scan rate. According to another embodiment of the disclosure, the processor 210 may display on the third screen 1230 an area where the first content 1211 is output at the first scan rate, and may display an area where the second content 1213 is output at the second scan rate.

Figure 13:
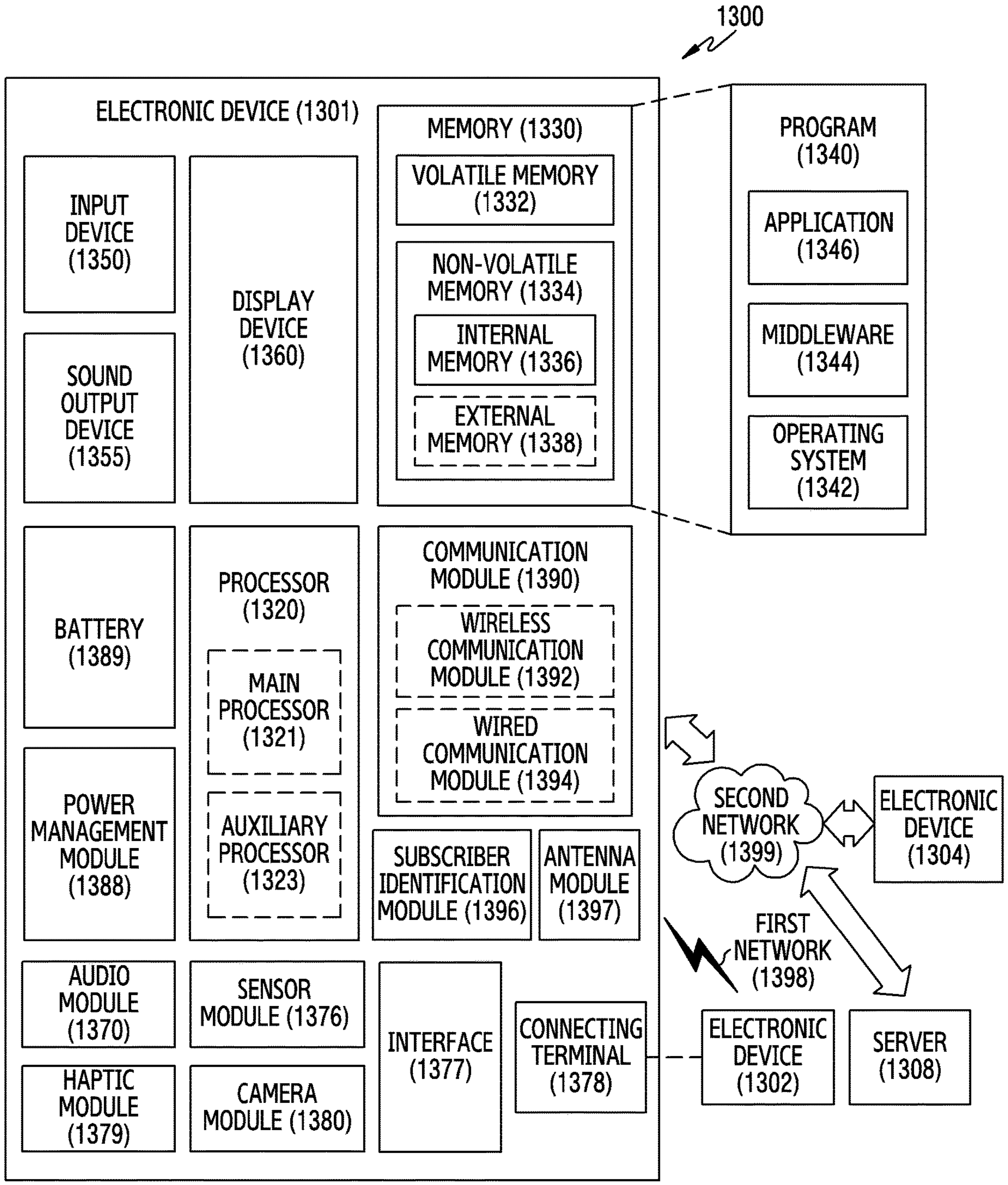
FIG. 13 is a block diagram of an electronic device in a network environment according to an embodiment of the disclosure.

FIG. 13 is a block diagram illustrating an electronic device 1301 in a network environment 1300 according to an embodiment of the disclosure.

Referring to FIG. 13, the electronic device 1301 in the network environment 1300 may communicate with an external electronic device 1302 via a first network 1398 (e.g., a short-range wireless communication network), or at least one of an external electronic device 1304 or a server 1308 via a second network 1399 (e.g., a long-range wireless communication network). According to an embodiment of the disclosure, the electronic device 1301 may communicate with the external electronic device 1304 via the server 1308. According to an embodiment of the disclosure, the electronic device 1301 may include a processor 1320, memory 1330, an input device 1350, a sound output device 1355, a display device 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments of the disclosure, at least one of the components (e.g., the connecting terminal 1378) may be omitted from the electronic device 1301, or one or more other components may be added in the electronic device 1301. In some embodiments of the disclosure, some of the components (e.g., the sensor module 1376, the camera module 1380, or the antenna module 1397) may be implemented as a single component (e.g., the display device 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment of the disclosure, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment of the disclosure, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment of the disclosure, the auxiliary processor 1323 (e.g., an image signal processor or a communication processor) may be implemented as part of another component (e.g., the camera module 1380 or the communication module 1390) functionally related to the auxiliary processor 1323. According to an embodiment of the disclosure, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by another component (e.g., the processor 1320) of the electronic device 1301, from the outside (e.g., a user) of the electronic device 1301. The input device 1350 may include, for example, a microphone, a mouse, a keyboard, a key (e.g., a button), or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment of the disclosure, the display device 1360 may include a touch sensor adapted to detect a touch, or a pressure sensor adapted to measure the intensity of force incurred by the touch.

The audio module 1370 may convert a sound into an electrical signal and vice versa. According to an embodiment of the disclosure, the audio module 1370 may obtain the sound via the input device 1350, or output the sound via the sound output device 1355 or a headphone of an external electronic device (e.g., the external electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment of the disclosure, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the external electronic device 1302) directly (e.g., wiredly) or wirelessly. According to an embodiment of the disclosure, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the external electronic device 1302). According to an embodiment of the disclosure, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1379 may include, for example, a motor, a piezoelectric element, or an electric stimulator.

The camera module 1380 may capture a still image or moving images. According to an embodiment of the disclosure, the camera module 1380 may include one or more lenses, image sensors, image signal processors, or flashes.

The power management module 1388 may manage power supplied to the electronic device 1301. According to one embodiment of the disclosure, the power management module 1388 may be implemented as at least part of, for example, a power management integrated circuit (PMIC).

The battery 1389 may supply power to at least one component of the electronic device 1301. According to an embodiment of the disclosure, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the external electronic device 1302, the external electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment of the disclosure, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the millimeter wave (mm Wave) band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the external electronic device 1304), or a network system (e.g., the second network 1399). According to an embodiment of the disclosure, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment of the disclosure, the antenna module 1397 may include an antenna including a radiating element including a conductive material or a conductive pattern formed in or on a substrate (e.g., a printed circuit board (PCB)). According to an embodiment of the disclosure, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment of the disclosure, another component (e.g., a radio frequency integrated circuit (RFIC)) other than the radiating element may be additionally formed as part of the antenna module 1397.

According to various embodiments of the disclosure, the antenna module 1397 may form a mmWave antenna module. According to an embodiment of the disclosure, the mm Wave antenna module may include a printed circuit board, an RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1301 and the external electronic device 1304 via the server 1308 coupled with the second network 1399. Each of the external electronic devices 1302 or 1304 may be a device of a same type as, or a different type, from the electronic device 1301. According to an embodiment of the disclosure, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment of the disclosure, the external electronic device 1304 may include an internet-of-things (IoT) device. The server 1308 may be an intelligent server using machine learning and/or a neural network. According to an embodiment of the disclosure, the external electronic device 1304 or the server 1308 may be included in the second network 1399. The electronic device 1301 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

As described above, an electronic device according to an embodiment (e.g., the electronic device 100 of FIGS. 1A and 1B) may include a first housing (e.g., the first housing 111 of FIGS. 1A and 1B), a second housing (e.g., the second housing 112 of FIGS. 1A and 1B) movable and at least partially superimposed with respect to the first housing, a display (e.g., the display 120 of FIGS. 1A and 1B) in which at least a first area is exposed to the outside of the electronic device through a front face of the electronic device, wherein the display has a second area extended from the first area of the display such that, when the electronic device switches from a first state to a second state, the second area is drawn out from inside the first housing and is exposed to the outside of the electronic device together with the first area, and when the electronic device switches from the second state to the first state, the second area is inserted into the first housing, and at least one processor operatively coupled to the display. The at least one processor may control the display such that the first area of the display operates at a first scan rate in the first state, control the display such that, while the electronic device switches from the first state to the second state, the display operates at a second scan rate higher than the first scan rate at least with respect to the first area, and control the display such that, in response to completion of the switching to the second state, the display operates at the first scan rate with respect to the first area and the second area.

According to an embodiment of the disclosure, while the electronic device switches from the first state to the second state, the at least one processor may dynamically change a scan rate with respect to at least the second area, based on at least one of a layout of a window displayed on the display and an attribute of an execution screen output to the display.

According to an embodiment of the disclosure, the at least one processor may classify the attribute of the execution screen according to whether there is movement on the screen within a specified threshold time, and dynamically change the scan rate according to the classified execution screen.

According to an embodiment of the disclosure, the at least one processor may change a position of the window, in response to the completion of the switching to the second state.

According to an embodiment of the disclosure, the first scan rate may be 60 Hz, and the second scan rate may be 120 Hz.

According to an embodiment of the disclosure, the at least one processor may provide an animation effect through the display, while the electronic device switches from the first state to the second state.

According to an embodiment of the disclosure, the electronic device may include at least one senor. The at least one processor may use the at least one sensor to detect movement of the second housing.

According to an embodiment of the disclosure, the at least one sensor may include at least one of a touch sensor, a time of flight (ToF) sensor, a proximity sensor, an inertial sensor, and a hall sensor.

As described above, a method of operating an electronic device may include controlling a display such that a first area of the display operates at a first scan rate in a first state of the electronic device, controlling the display such that, while the electronic device switches from the first state to a second state, the display operates at a second scan rate higher than the first rate at least with respect to the first area, and controlling the display such that, in response to completion of the switching to the second state, the display operates at the first scan rate with respect to the first area and the second area.

The method of operating the electronic device according to an embodiment may further include, while the electronic device switches from the first state to the second state, dynamically changing a scan rate with respect to at least the second area, based on at least one of a layout of a window displayed on the display and an attribute of an execution screen output to the display.

The method of operating the electronic device according to an embodiment may further include classifying the attribute of the execution screen according to whether there is movement on the screen within a specified threshold time, and dynamically changing the scan rate according to the classified execution screen.

The method of operating the electronic device according to an embodiment may further include changing a position of the window, in response to the completion of the switching to the second state.

The method of operating the electronic device according to an embodiment may further include providing an animation effect through the display, while the electronic device switches from the first state to the second state.

The method of operating the electronic device according to an embodiment may further include detecting movement of a second housing by using at least one of a touch sensor, a Time of Flight (ToF) sensor, a proximity sensor, an inertial sensor, and a hall sensor.

In the method of operating the electronic device according to an embodiment of the disclosure, the first scan rate may be 60 Hz, and the second scan rate may be 120 Hz.

As described above, the electronic device 100 according to an embodiment may include a first housing, a second housing movable and at least partially superimposed with respect to the first housing, a flexible display of which an exposure area exposed through a front face of the electronic device varies depending on relative movement of the first and second housings, and at least one processor operatively coupled to the display. The at least one processor may display first content on the flexible display at a first scan rate in a first state, display the first content on a first area in the exposure area of the display at a second scan rate while the electronic device is in the first state, and display second content different from the first content on a second area in the exposure area at a third scan rate. The second scan rate and the third scan rate may be determined based on attributes of the first content and the second content, respectively. The display may display the first content and the second content at the first scan rate with respect to the first area and the second area, in response to completion of switching to the second state.

According to an embodiment of the disclosure, the at least one processor may change a position at which content is displayed on the display, in response to the completion of the switching to the second state.

According to an embodiment of the disclosure, the at least one processor may provide an animation effect through the display, while the electronic device switches from the first state to the second state.

According to an embodiment of the disclosure, the electronic device may include at least one senor. The at least one processor may use the at least one sensor to detect movement of the second housing.

According to an embodiment of the disclosure, the at least one sensor may include at least one of a touch sensor, a ToF sensor, a proximity sensor, an inertial sensor, and a hall sensor.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

a first housing;

a second housing movable and at least partially superimposed with respect to the first housing;

a display of which at least a first area is exposed to outside of the electronic device through a front face of the electronic device, wherein the display has a second area extended from the first area of the display such that, when the electronic device switches from a first state to a second state, the second area is drawn out from inside the first housing and is exposed to the outside of the electronic device together with the first area, and when the electronic device switches from the second state to the first state, the second area is inserted into the first housing;

one or more processors; and memory storing one or more computer programs including computer-executable instructions that, when executed by the one or more processors, cause the electronic device to:

display dynamic content at the first area of the display and control the display such that the first area of the display operates at a first scan rate in the first state, while the electronic device switches from the first state to the second state, display the dynamic content at the first area and at least a portion of the second area and control the display such that the display operates at a second scan rate higher than the first scan rate at the first area and the at least the portion of the second area, and control the display such that, in response to completion of the switching to the second state, the display operates at the first scan rate with respect to the first area and the second area.

2. The electronic device of claim 1, wherein, while the electronic device switches from the first state to the second state, the one or more computer programs further comprise computer-executable instructions that, when executed by the one or more processors, cause the electronic device to dynamically change a scan rate with respect to at least the second area, based on at least one of a layout of a window displayed on the display and an attribute of an execution screen output to the display.

3. The electronic device of claim 2, wherein the one or more computer programs further comprise computer-executable instructions that, when executed by the one or more processors, cause the electronic device to classify the attribute of the execution screen according to whether there is movement on a screen within a specified threshold time, and dynamically changes the scan rate according to the classified execution screen.

4. The electronic device of claim 2, wherein the one or more computer programs further comprise computer-executable instructions that, when executed by the one or more processors, cause the electronic device to change a position of the window, in response to the completion of the switching to the second state.

5. The electronic device of claim 1, wherein the first scan rate is 60 Hz, and the second scan rate is 120 Hz.

6. The electronic device of claim 1, wherein the one or more computer programs further comprise computer-executable instructions that, when executed by the one or more processors, cause the electronic device to provide an animation effect through the display, while the electronic device switches from the first state to the second state.

7. The electronic device of claim 1, further comprising:

at least one sensor, wherein one or more computer programs further comprise computer-executable the instructions that, when executed by the one or more processors, cause the electronic device to use the at least one sensor to detect movement of the second housing.

8. The electronic device of claim 7, wherein the at least one sensor includes at least one of a touch sensor, a time of flight (ToF) sensor, a proximity sensor, an inertial sensor, and a hall sensor.

9. A method of operating an electronic device, the method comprising:

displaying dynamic content at a first area of the display and controlling a display such that the first area of the display operates at a first scan rate in a first state of the electronic device;

while the electronic device switches from the first state to a second state, displaying the dynamic content at the first area and at least a portion of a second area that extends from the first area and controlling the display such that the display operates at a second scan rate higher than a first rate at the first area and the at least the portion of the second area; and controlling the display such that, in response to completion of the switching to the second state, the display operates at the first scan rate with respect to the first area and a second area.

10. The method of claim 9, further comprising, while the electronic device switches from the first state to the second state, dynamically changing a scan rate with respect to at least the second area, based on at least one of a layout of a window displayed on the display and an attribute of an execution screen output to the display.

11. The method of claim 10, further comprising classifying the attribute of the execution screen according to whether there is movement on a screen within a specified threshold time, and dynamically changing the scan rate according to the classified execution screen.

12. The method of claim 10, further comprising changing a position of the window, in response to the completion of the switching to the second state.

13. The method of claim 9, further comprising providing an animation effect through the display, while the electronic device switches from the first state to the second state.

14. The method of claim 9, further comprising detecting movement of a second housing using at least one sensor.

15. The method of claim 14, wherein the at least one sensor includes at least one of a touch sensor, a time of flight (ToF) sensor, a proximity sensor, an inertial sensor, and a hall sensor.

16. The method of claim 9, wherein the first scan rate is 60 Hz, and the second scan rate is 120 Hz.

17. One or more non-transitory computer-readable storage media storing computer-executable instructions that, when executed by one or more processors of an electronic device, cause the electronic device to perform operations, the operations comprising:

displaying dynamic content at a first area of the display and controlling a display such that the first area of the display operates at a first scan rate in a first state of the electronic device;

while the electronic device switches from the first state to a second state, displaying the dynamic content at the first area and at least a portion of a second area that extends from the first area and controlling the display such that the display operates at a second scan rate higher than a first rate at the first area and the at least the portion of the second area; and controlling the display such that, in response to completion of the switching to the second state, the display operates at the first scan rate with respect to the first area and a second area.

18. The one or more non-transitory computer-readable storage media of claim 17, the operations further comprising:

while the electronic device switches from the first state to the second state, dynamically changing a scan rate with respect to at least the second area, based on at least one of a layout of a window displayed on the display and an attribute of an execution screen output to the display.

19. The one or more non-transitory computer-readable storage media of claim 18, the operations further comprising:

classifying the attribute of the execution screen according to whether there is movement on a screen within a specified threshold time, and dynamically changing the scan rate according to the classified execution screen.

20. The one or more non-transitory computer-readable storage media of claim 18, the operations further comprising:

changing a position of the window, in response to the completion of the switching to the second state.

* * * * *